(12) United States Patent
Xie et al.

(10) Patent No.: US 6,822,793 B2
(45) Date of Patent: Nov. 23, 2004

(54) COMPACT POLARIZATION INSENSITIVE CIRCULATORS WITH SIMPLIFIED STRUCTURE AND LOW POLARIZATION MODE DISPERSION

(75) Inventors: Ping Xie, San Jose, CA (US); Yonglin Huang, San Jose, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 09/944,593

(22) Filed: Aug. 31, 2001

(65) Prior Publication Data

US 2002/0024729 A1 Feb. 28, 2002

Related U.S. Application Data

(63) Continuation of application No. 09/432,382, filed on Oct. 29, 1999, now Pat. No. 6,285,499.

(51) Int. Cl.[7] .................................................. G02B 5/30
(52) U.S. Cl. .................... 359/497; 359/359; 359/495; 359/496; 359/484
(58) Field of Search ...................... 359/484, 494–497; 385/11, 36

(56) References Cited

U.S. PATENT DOCUMENTS

| 3,781,714 A | 12/1973 | Schlossberg ............... 331/94.5 |
| 4,294,509 A | 10/1981 | Nagao ..................... 350/96.15 |
| 4,464,022 A | 8/1984 | Emkey ....................... 350/377 |
| 4,548,478 A | 10/1985 | Shirasaki .................... 350/377 |
| 4,554,449 A | 11/1985 | Taniuchi et al. ............ 250/227 |
| 4,720,162 A | 1/1988 | Mochizuki et al. ....... 350/96.15 |
| 4,741,588 A | 5/1988 | Nicia et al. .............. 350/96.19 |
| 4,761,050 A | 8/1988 | Byron ..................... 350/96.15 |
| 4,805,977 A | 2/1989 | Tamura et al. ........... 350/96.15 |
| 4,960,331 A | 10/1990 | Goldman et al. ........... 356/350 |
| 5,033,830 A | 7/1991 | Jameson ..................... 350/377 |
| 5,089,785 A | 2/1992 | Hand ......................... 328/233 |
| 5,115,340 A | 5/1992 | Tidwell ..................... 359/484 |
| 5,191,467 A | 3/1993 | Kapany et al. ............. 359/341 |
| 5,204,771 A | 4/1993 | Koga ......................... 359/281 |
| 5,212,586 A | 5/1993 | Van Delden ............... 359/281 |
| 5,272,560 A | 12/1993 | Baney et al. ............... 359/249 |
| 5,303,314 A | 4/1994 | Duling, III et al. .......... 385/11 |
| 5,319,483 A | 6/1994 | Krasinski et al. ........... 359/113 |
| 5,471,340 A | 11/1995 | Cheng et al. ............... 359/281 |
| 5,546,219 A | 8/1996 | Iida ........................... 359/281 |
| 5,557,692 A | 9/1996 | Pan et al. ..................... 385/11 |
| 5,559,633 A | 9/1996 | Emkey ....................... 359/484 |
| 5,566,259 A | 10/1996 | Pan et al. ..................... 385/11 |
| 5,574,595 A | 11/1996 | Kurata et al. ............... 359/484 |
| 5,574,596 A | 11/1996 | Cheng ........................ 359/484 |
| 5,682,446 A | 10/1997 | Pan et al. ..................... 385/11 |
| 5,689,367 A | 11/1997 | Pan et al. ................... 359/495 |
| 5,689,593 A | 11/1997 | Pan et al. ..................... 385/11 |
| 5,706,371 A | 1/1998 | Pan ............................. 385/11 |
| 5,729,377 A | 3/1998 | Bergmann .................. 359/249 |

(List continued on next page.)

FOREIGN PATENT DOCUMENTS

| DE | 196 30 737 A1 | 2/1997 |
| EP | 0 576 072 A1 | 12/1993 |
| EP | 0 653 661 A1 | 5/1995 |
| EP | 0 814 361 A1 | 12/1997 |
| EP | 0 965 867 A1 | 12/1999 |
| GB | 2 264 181 A | 8/1993 |
| JP | 8094969 | 4/1996 |

(List continued on next page.)

*Primary Examiner*—Mark A. Robinson
*Assistant Examiner*—Lee Fineman
(74) *Attorney, Agent, or Firm*—Workman Nydegger

(57) ABSTRACT

Disclosed are optical circulators including a first beam displacer/combiner, a first nonreciprocal rotator, a first beam angle turner, a second beam angle turner, a second nonreciprocal rotator, and a second beam displacer/combiner, together with methods of using the optical circulators and telecommunications systems including the optical circulators.

22 Claims, 12 Drawing Sheets

U.S. PATENT DOCUMENTS

| | | | |
|---|---|---|---|
| 5,734,763 A | 3/1998 | Chang | 385/11 |
| 5,740,288 A | 4/1998 | Pan | 385/11 |
| 5,774,215 A | 6/1998 | Padgett et al. | 356/346 |
| 5,804,814 A | 9/1998 | Musha et al. | 250/201.5 |
| 5,818,981 A | 10/1998 | Pan et al. | 385/11 |
| 5,850,493 A | 12/1998 | Cheng | 385/34 |
| 5,909,310 A | 6/1999 | Li et al. | 359/484 |
| 5,930,039 A | 7/1999 | Li et al. | 359/484 |
| 5,941,076 A | 8/1999 | Sandelis | 60/752 |
| 5,956,441 A | 9/1999 | Fairchild et al. | 385/27 |
| 5,982,539 A * | 11/1999 | Shirasaki | 359/484 |
| 6,011,649 A | 1/2000 | Chang | 359/484 |
| 6,014,244 A | 1/2000 | Chang | 359/281 |
| 6,026,202 A | 2/2000 | Chang | 385/11 |
| 6,049,426 A * | 4/2000 | Xie et al. | 359/484 |
| 6,052,228 A * | 4/2000 | Xie et al. | 359/495 |
| 6,088,491 A | 7/2000 | Sorin et al. | 385/11 |
| 6,285,499 B1 * | 9/2001 | Xie et al. | 359/484 |
| 6,438,278 B1 * | 8/2002 | Liu et al. | 385/11 |

FOREIGN PATENT DOCUMENTS

| | | |
|---|---|---|
| WO | WO 90/15357 | 12/1990 |
| WO | WO 94/09400 | 4/1994 |
| WO | WO 96/19743 | 6/1996 |
| WO | WO 97/22034 | 6/1997 |
| WO | WO 98/23983 | 6/1998 |

* cited by examiner

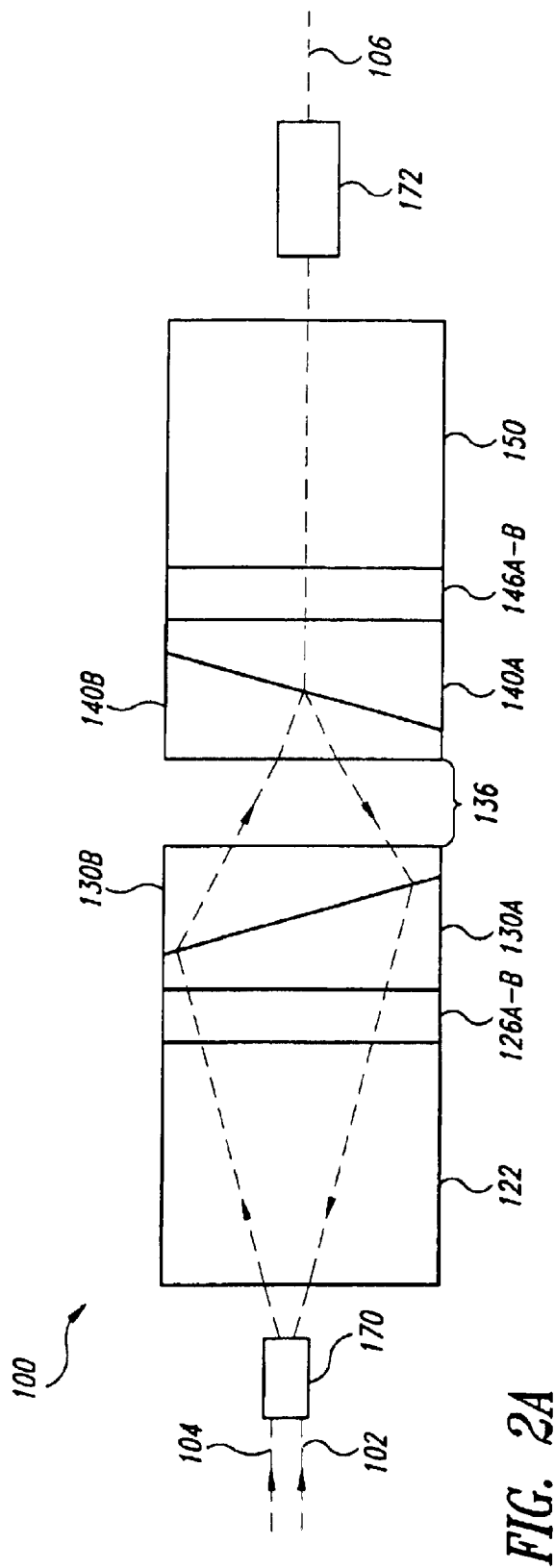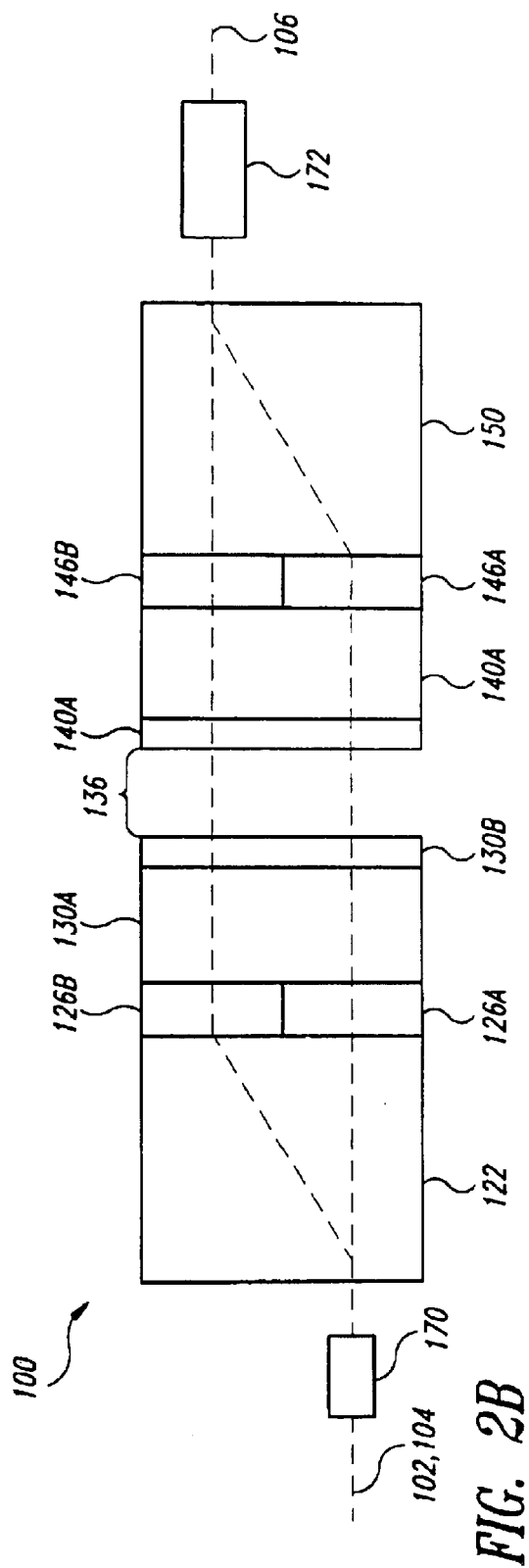

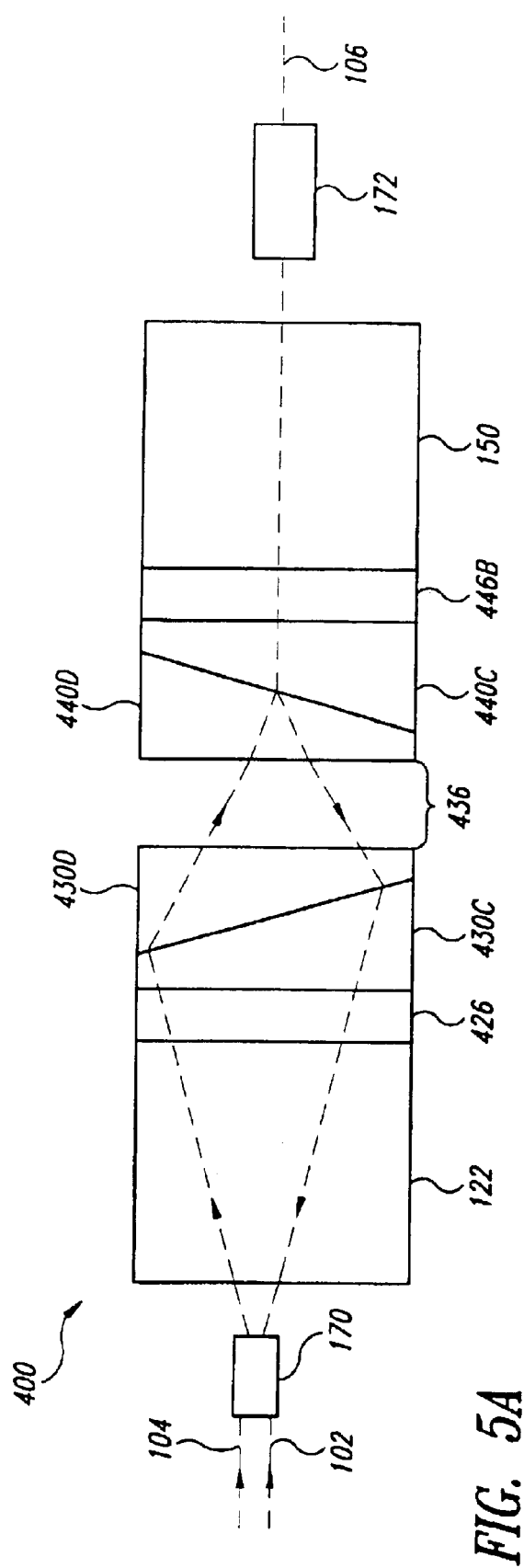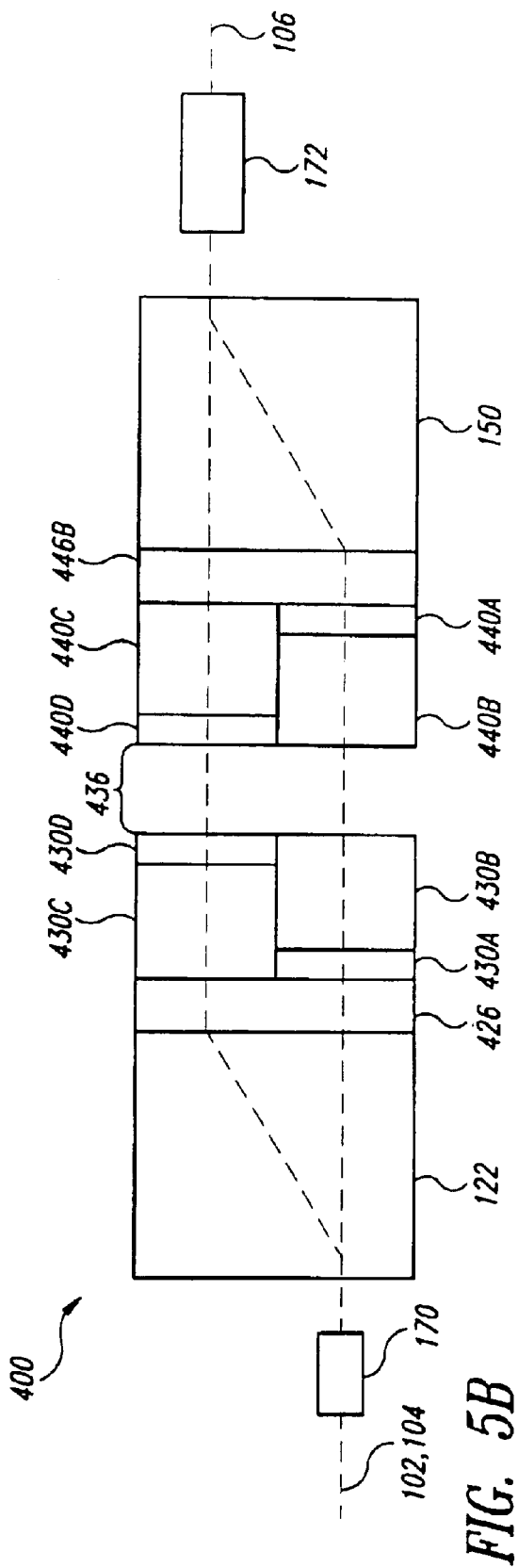

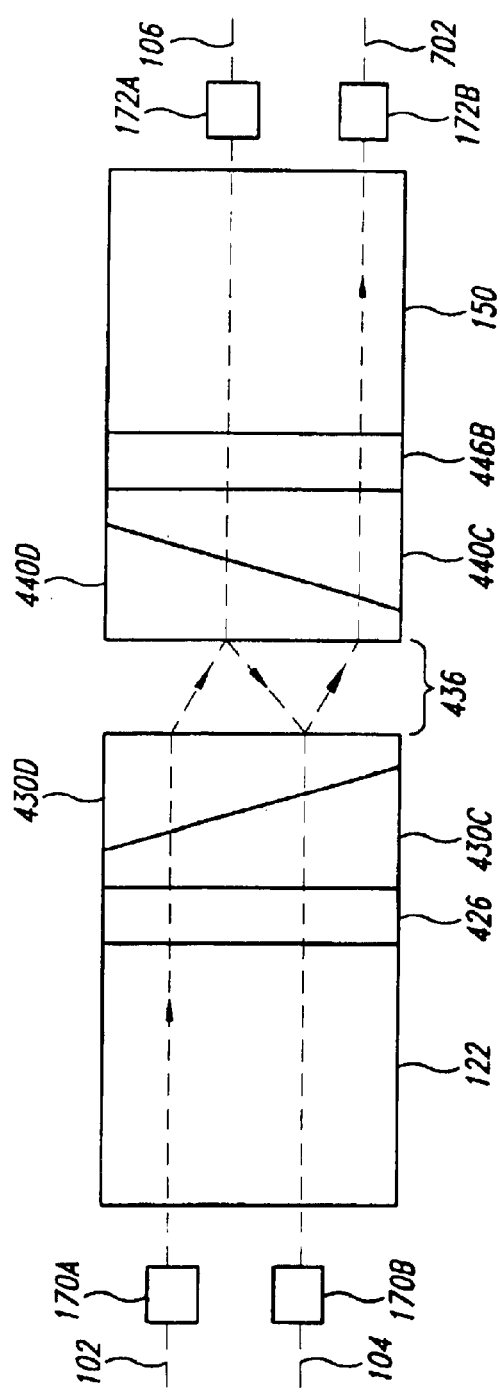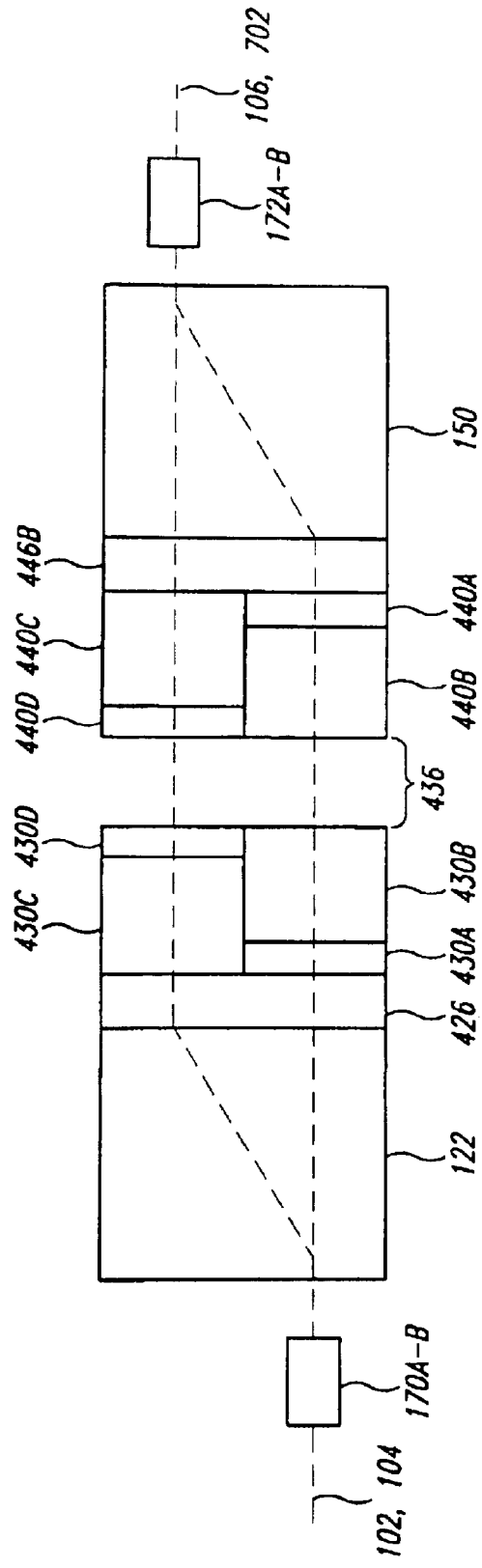
FIG. 8A
FIG. 8B

COMPACT POLARIZATION INSENSITIVE CIRCULATORS WITH SIMPLIFIED STRUCTURE AND LOW POLARIZATION MODE DISPERSION

This application is a continuation of Ser. No. 09/432,382, filed Oct. 29, 1999, now U.S. Pat. No. 6,285,499 B1, which is fully incorporated herein by reference.

BACKGROUND OF THE INVENTION

1. Field of the Invention

The invention relates to optical devices; more particularly, it relates to optical circulators.

2. Description of Related Art

An optical circulator is a nonreciprocal, typically three-port or four-port, device. Light entering the first port passes out the second port, but light entering the second port can not pass back to first port. Instead, it passes out of the third port. By installing an optical circulator at each end of a fiber link, an existing unidirectional fiber optic communication link can be quickly and economically converted to a bi-directional one. Such a modification results in a doubled bit carrying capacity. An optical circulator can also be used in applications such as wavelength division multiplexer (WDM), Erbium-doped fiber amplifier (EDFA), add-drop multiplexers, dispersion compensators and optical time domain reflectometers (OTDR=s).

Optical circulators are a key element in today's optical networks. However, it has not been widely adopted because of its high cost. A typical optical circulator usually comprises many optical elements and has a large optical footprint. Manufacturing of conventional optical circulators usually requires precise alignment of each optical element, leading to low yields and high production costs.

An early concept of a polarization independent optical circulator for telecommunication use was disclosed in Matsumoto, U.S. Pat. No. 4,272,159. This document, and all others referred to herein, are incorporated by reference as if reproduced fully herein. Such circulators are widely used in conventional WDM optical networks.

Optical circulators have been described in patents, including the above-mentioned Matsumoto, U.S. Pat. No. 4,272,159; Emkey, U.S. Pat. No. 4,464,022; and Kuwahara, and U.S. Pat. No. 4,650,289. However, these early optical circulators often suffer from high insertion loss and/or cross-talk that is unacceptably high for many communications applications. Insertion loss is defined as the difference between the power between light launched into the optical circulator and the power that exits the device. Insertion loss is largely due to coupling loss from fiber to fiber, absorption of light and to imperfect polarization separation. Cross-talk in an optical circulator refers to the amount of power emitted at port 3 (to the receiver) from light entering at port 1 (from the transmitter). The conventional polarizing cubes used in these prior optical circulators often cause large insertion loss and cross-talk because of its low polarization extinction ratio.

Recent circulators as described in Koga, U.S. Pat. No. 5,204,771; and U.S. Pat. No. 5,319,483 represent some improvement in either insertion loss or cross talk. The optical circulators of Koga involve a beam path determining means for introducing a beam to a different direction depending upon the direction of the electric field vector and the propagation. In the context of the Koga circulators, the different direction being referred to is really an example of beam shifting, rather than a change in propagation direction. The beam path determining means of Koga shift a beam such that possesses the same propagation direction but is spatially located in a different portion of the circulator. In this sense, the input beam to and output beam from the beam path determining means are parallel in propagation direction but are shifted in spatial location. A disadvantage of the Koga circulators is that the construction of these circulators demands precise fabrication of birefringent crystals and precise matching waveplates. These types of circulators are therefore often difficult and costly to make. The size of these circulators is also excessively large.

Recent circulators disclosed in Cheng, U.S. Pat. No. 5,471,340; and Cheng, U.S. Pat. No. 5,574,596, appear to have low insertion loss and cross talk, and also to have a simplified structure compared to previous circulators. The Cheng patents disclose the use of beam path determining means of several long birefringent crystals to replace conventional polarizing cubes. The beam path determining means serve to shift the beams passing through, rather than changing the propagation direction. A disadvantage of the Cheng circulators is that long birefringent crystals are often difficult to fabricate. They are also quite expensive. Furthermore, the footprint of this type of circulator is more bulky than other circulators.

Another, fairly serious, drawback of the Cheng circulators is that polarization mode dispersion ("PMD") in the circulators is not eliminated unless additional compensation crystals are introduced. Such additional crystals add significant cost and complexity. Polarization mode dispersion is introduced in an optical component when signal energy at a given wavelength is resolved into two orthogonal polarization modes of slightly different propagation velocity or optical path. The resulting difference in propagation time between polarization modes is called differential group delay or PMD. PMD causes a number of serious capacity impairments, including pulse broadening. In addition, alignment of this type of circulators depends on sub-micron precision positioning of single mode fibers. Therefore, manufacturing of the PMD corrected Cheng circulators is non-trivial.

Pan, U.S. Pat. No. 5,689,593, describes another type of circulator that uses several polarization beam splitting prisms to arrange all optical ports on one side and eliminate polarization mode dispersion. This design has the convenience of having all optical ports on one side. Additionally, polarization mode dispersion is eliminated by symmetry of the optical path. However this design uses several polarization beam splitter cubes, making it very bulky and expensive.

Given the above-mentioned problems with prior art optical circulators, there is a need for a simplified optical circulator comprised of simple optical elements with reduced polarization mode dispersion that is suitable for volume manufacturing.

SUMMARY OF THE INVENTION

In one aspect, the invention relates to an optical circulator having a longitudinal axis comprising a first beam displacer/combiner that displaces at least one optical beam into two polarized component beams and combines at least two polarized component beams to form an optical beam; a first nonreciprocal rotator, optically coupled to the first beam displacer/combiner distally along the longitudinal axis, for rotating the polarization orientation of the polarized component beams;

a first beam angle turner, optically coupled to the first nonreciprocal rotator distally along the longitudinal axis, for turning the polarized component beams through an angle, wherein the path of the polarized beam converges to or diverges from the longitudinal axis of the circulator depending upon the polarization and propagation direction of the polarized component beam; a second beam angle turner, optically coupled to the first beam angle turner distally along the longitudinal axis, for turning the polarized component beams through an angle, wherein the path of the polarized beam converges to or diverges from the longitudinal axis of the circulator depending upon the polarization and propagation direction of the polarized component beam; a second nonreciprocal rotator, optically coupled to the second beam angle turner distally along the longitudinal axis, for rotating the polarization orientation of the polarized component beams; and a second beam displacer/combiner, optically coupled to the second nonreciprocal rotator distally along the longitudinal axis, that displaces at least one optical beam into two polarized component beams and combines at least two polarized component beams to form an optical beam.

In another aspect, the invention relates to an optical circulator having optical beam paths comprising a first beam displacer/combiner that displaces at least one optical beam into two polarized component beams and combines at least two polarized component beams to form an optical beam; a second beam displacer/combiner, optically coupled to the first beam displacer/combiner optically coupled to the first beam displacer/combiner along the optical beam paths, that displaces at least one optical beam into two polarized component beams and combines at least two polarized component beams to form an optical beam; a first beam angle turner, optically coupled to the first beam displacer/combiner along the optical beam paths, for turning the polarized component beams through an angle, wherein the path of the polarized beam converges to or diverges from the beam path possessed by the polarized component beams immediately before entering the first beam angle turner depending upon the polarization and propagation direction of the polarized component beam; a second beam angle turner, optically coupled to the second beam displacer/combiner and the first beam angle turner along the optical beam paths, for turning the polarized component beams through an angle, wherein the path of the polarized beam converges to or diverges from the beam path possessed by the polarized component beams immediately before entering the second beam angle turner depending upon the polarization and propagation direction of the polarized component beam; a first nonreciprocal rotator, optically coupled to the first beam displacer/combiner and the beam angle turner along the optical beam paths, for rotating the polarization orientation of the polarized component beams; and a second nonreciprocal rotator, optically coupled to the second beam angle turner and the second beam displacer/combiner, for rotating the polarization orientation of the polarized component beams.

BRIEF DESCRIPTION OF THE DRAWINGS

FIGS. 2A–B show a top and side isometric view of the three-port optical circulator of FIG. 1

FIGS. 5A–B show a top and side isometric view of the three-port optical circulator of FIG. 4

FIGS. 8A–B show a top and side isometric view of the four-port optical circulator of FIG. 7

DETAILED DESCRIPTION OF THE INVENTION

Figure 1:
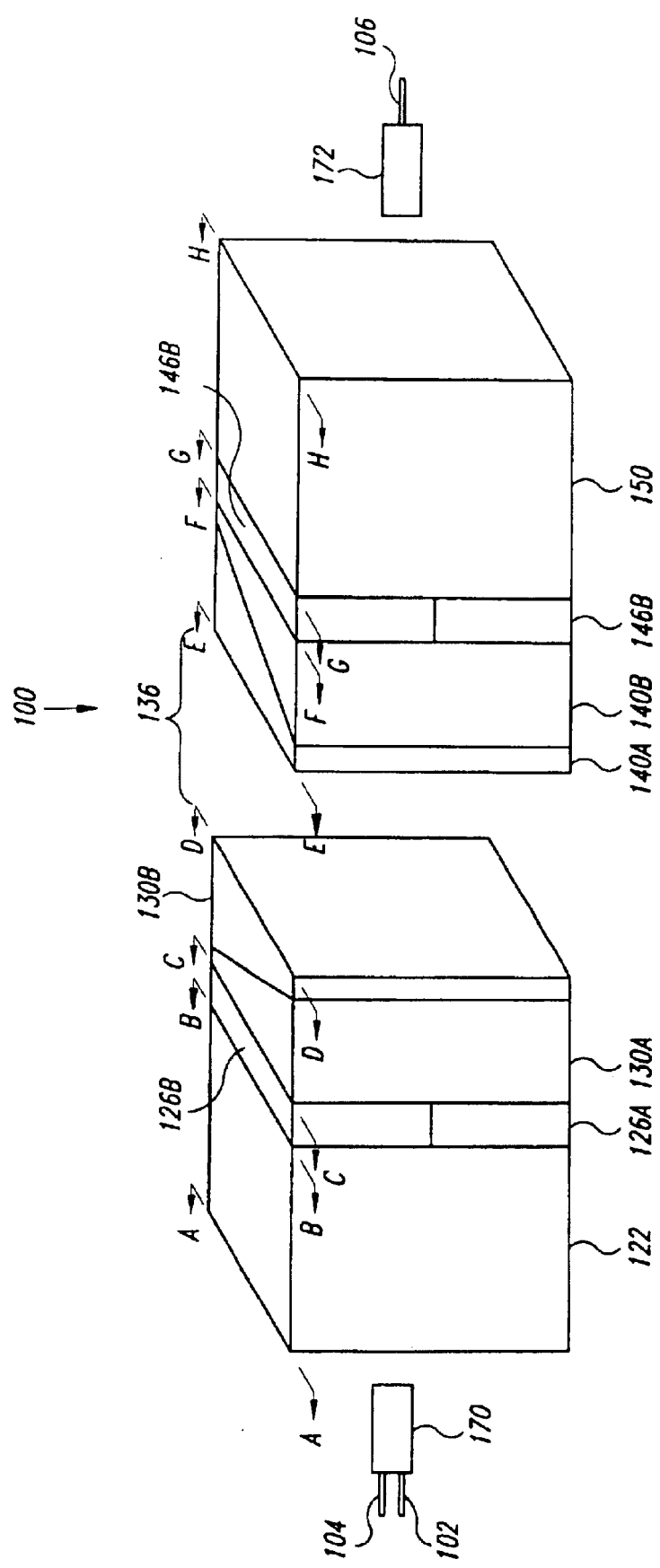
FIG. 1 shows a side isometric view of an embodiment of a three-port optical circulator according to the invention.

The circulators of this invention have several advantages over prior art circulators. First, both first optical port 102 and third optical port 104, as described below, are placed next to each other and may share the same imaging element. This means that the three port embodiments of the inventive circulators may have a reduced lens count and a much reduced optical footprint in comparison with conventional three port circulators. Conventional three port optical circulators have an arrangement wherein each optical port has its own individual imaging element. Further, the use of beam angle turners such as Wollaston or modified Wollaston or Rochon or modified Rochon prism pairs allows the separation between the light traveling from first optical port 102 to second optical port 106, described below, and the light traveling from second optical port 106 to third optical port 104 to be adjusted. This is accomplished by adjusting the length of complete gap 136, described below. In comparison with the prior art walk-off crystal approach, a long birefringent crystal is not needed to achieve acceptable separation between the light pathways. The modified Wollaston or Rochon prisms differ from conventional Wollaston or Rochon prisms in their relative optical axis orientation, for example, in a modified Wollaston prism, the optical axis of the wedges are oriented perpendicularly to one another and 45 degrees in the plane of normal incidence with respect to the optical axis in a conventional Wollaston prism. An advantage of using such a modified prism is that the use of an additional waveplate may be able to be avoided. An additional waveplate increases system complexity and leads to narrower operating wavelength bandwidth. Another advantage of the inventive optical circulators accrues because of the inventive circulator's symmetrical crystal layout. The inventive circulator's symmetrical crystal layout provides a symmetric beam path for two polarization components from each port, leading to much reduced, or even substantially eliminated, polarization mode dispersion. In another aspect of the invention, only one lens is used on each side of the circulator, leading to fewer optical elements and a smaller footprint. In another aspect of the invention, an optical signal may be circulated by passing it though an optical pathway wherein the optical pathway comprises at least one circulator according to the invention. In another aspect of the invention, the inventive optical circulators may be used in telecommunications systems and in WDM's, EDFA's, add-drop multiplexers, dispersion compensators and OTDR=s. These and other advantages of the inventive optical circulators are elaborated in the specific embodiments now described.

In one aspect, the invention relates to an optical circulator having a longitudinal axis comprising a first beam displacer/combiner that displaces at least one optical beam into two polarized component beams and combines at least two polarized component beams to form an optical beam; a first nonreciprocal rotator, optically coupled to the first beam displacer/combiner distally along the longitudinal axis, for rotating the polarization orientation of the polarized component beams; a first beam angle turner, optically coupled to the first nonreciprocal rotator distally along the longitudinal axis, for turning the polarized component beams through an angle, wherein the path of the polarized beam converges to or diverges from the longitudinal axis of the circulator depending upon the polarization and propagation direction of the polarized component beam; a second beam angle turner, optically coupled to the first beam angle turner distally along the longitudinal axis, for turning the polarized component beams through an angle, wherein the path of the polarized beam converges to or diverges from the longitudinal axis of the circulator depending upon the polarization and propagation direction of the polarized component beam; a second nonreciprocal rotator, optically coupled to the second beam angle turner distally along the longitudinal axis, for rotating the polarization orientation of the polarized component beams; and a second beam displacer/combiner, optically coupled to the second nonreciprocal rotator distally along the longitudinal axis, that displaces at least one optical beam into two polarized component beams and combines at least two polarized component beams to form an optical beam.

In another aspect, the invention relates to the optical circulator further comprising at least one imaging element, optically coupled to the first beam displacer/combiner proximally along the longitudinal axis, for turning two or more adjacently spaced optical beams in a convergent or divergent propagation direction with respect to the longitudinal axis of the circulator. In yet another aspect, the invention relates to the optical circulator further comprising at least one imaging element, optically coupled to the second beam displacer/combiner distally along the longitudinal axis, for coupling light into or collimating light from the second beam displacer/combiner.

In still another aspect, the invention relates to the optical circulator wherein the first and second beam displacer/combiners comprise birefringent crystal plates. In another aspect, the invention relates to the optical circulator further comprising three or more optical ports distributed such that at least two optical ports are optically coupled to the first beam displacer/combiner proximally along the longitudinal axis, and one optical port is optically coupled to the second beam displacer/combiner distally along the longitudinal axis. In yet another aspect, the invention relates to the optical circulator comprising 4 or more optical ports.

In a further aspect, the invention relates to the optical circulator wherein the first or second beam angle turners comprise Rochon or Wollaston prisms, modified Rochon or Wollaston prisms or a pair of birefringent wedges separated by a complete gap. In still another aspect, the invention relates to the optical circulator wherein the each of the first or second beam angle turners comprise two or more Rochon, Wollaston, modified Rochon or Wollaston prisms or a pair of birefringent wedges separated by a complete gap. In yet another aspect, the invention relates to the optical circulator wherein the first and second beam angle turners define a complete gap along the longitudinal axis of the optical circulator and between the first and second beam angle turners. In another aspect, the invention relates to the optical circulator wherein the first or second beam angle turner defines a complete gap along the longitudinal axis of the circulator and the complete gap separates portions of the first or second beam angle turners. In still another aspect, the invention relates to the optical circulator wherein the first or second nonreciprocal rotators comprise Faraday rotators.

In a further aspect, the invention relates to the optical circulator wherein the first or second nonreciprocal rotators comprise two or more nonreciprocal rotators, and each of the two or more nonreciprocal rotators rotates a polarization orientation of polarized component beams passing through to it a same or different polarization orientation with respect to others of the two or more nonreciprocal rotators. In yet another aspect, the invention relates to the optical circulator wherein each of the two or more nonreciprocal rotators rotates a polarization orientation of polarized component beams passing through to a different polarization orientation with respect to others of the two or more nonreciprocal rotators. In another aspect, the invention relates to the optical circulator where polarization mode dispersion is substantially eliminated.

In an aspect, the invention relates to an optical circulator having optical beam paths, the optical circulator comprising a first beam displacer/combiner that displaces at least one optical beam into two polarized component beams and combines at least two polarized component beams to form an optical beam; a second beam displacer/combiner, optically coupled to the first beam displacer/combiner along the optical beam paths, that displaces at least one optical beam into two polarized component beams and combines at least two polarized component beams to form an optical beam; a first beam angle turner, optically coupled to the first beam displacer/combiner along the optical beam paths, for turning the polarized component beams through an angle, wherein the path of the polarized beam converges to or diverges from the beam path possessed by the polarized component beams immediately before entering the first beam angle turner depending upon the polarization and propagation direction of the polarized component beam; a second beam angle turner, optically coupled to the second beam displacer/combiner and the first beam angle turner along the optical beam paths, for turning the polarized component beams through an angle, wherein the path of the polarized beam converges to or diverges from the beam path possessed by the polarized component beams immediately before entering the second beam angle turner depending upon the polarization and propagation direction of the polarized component beam; a first nonreciprocal rotator, optically coupled to the first beam displacer/combiner and the beam angle turner along the optical beam paths, for rotating the polarization orientation of the polarized component beams; and a second nonreciprocal rotator, optically coupled to the second beam angle turner and the second beam displacer/combiner, for rotating the polarization orientation of the polarized component beams.

In another aspect, the invention relates to the optical circulator further comprising at least one imaging element, optically coupled to the first beam displacer/combiner, for turning two or more adjacently spaced optical beams in a convergent or divergent propagation direction from the beam path possessed by the optical beam immediately before it enters the first imaging element. In yet another aspect, the invention relates to the optical circulator further comprising at least one imaging element, optically coupled to the second beam displacer/combiner, for coupling light into or collimating light from the second beam displacer/combiner. In still another aspect, the invention relates to the optical circulator wherein the first and second beam displacer/combiners comprise birefringent crystal plates. In another aspect, the invention relates to the optical circulator further comprising three or more optical ports distributed such that at least two optical ports are optically coupled to the first beam displacer/combiner, and one optical port is optically coupled to the second beam displacer/combiner. In still another aspect, the invention relates to the optical circulator comprising 4 or more optical ports.

In another aspect, the invention relates to the optical circulator wherein the first or second beam angle turners comprise Rochon, Wollaston, or modified Rochon or Wollaston prisms or a pair of birefringent wedges separated by a complete gap. In yet another aspect, the invention relates to the optical circulator wherein the each of the first or second beam angle turners comprise two or more Rochon or Wollaston prisms or modified Rochon or Wollaston prisms or a pair of birefringent wedges separated by a complete gap. In another aspect, the invention relates to the optical circulator wherein the first and second beam angle turners define a complete gap along the optical beam paths. In another aspect, the invention relates to the optical circulator wherein the first or second beam angle turner defines a complete gap along the optical beam paths and the complete gap separates portions of the first or second beam angle turners. In yet another aspect, the invention relates to the optical circulator wherein the first or second nonreciprocal rotators comprise Faraday rotators.

In another aspect, the invention relates to the optical circulator wherein the first or second nonreciprocal rotators comprise two or more nonreciprocal rotators, and each of the two or more nonreciprocal rotators rotates a polarization orientation of polarized component beams passing through to a same or different polarization orientation with respect to others of the two or more nonreciprocal rotators. In still another aspect, the invention relates to the optical circulator wherein each of the two or more nonreciprocal rotators rotates a polarization orientation of polarized component beams passing through to a different polarization orientation with respect to others of the two or more nonreciprocal rotators. In a further aspect, the invention relates to the optical circulator wherein the polarization mode dispersion is substantially eliminated.

In an aspect, the invention relates to an optical telecommunications system comprising the optical circulator described above. In another aspect, the invention relates to the optical telecommunications system, wherein the optical telecommunications system comprises a wavelength division multiplexer, an Erbium-doped fiber amplifier, an add-drop multiplexer, a dispersion compensator, or an optical time domain reflectometer.

In an aspect, the invention relates to a method of adjusting beam separation of optical beams entering or exiting the optical circulator described above comprising adjusting a length of a complete gap along the horizontal axis of the optical circulator and defined by the first and second beam angle turners. In another aspect, the invention relates to a method of adjusting beam separation of optical beams in the circulator described above comprising adjusting a length of a complete gap defined by the first and second beam angle turners.

In another aspect, the invention relates to a method of circulating a optical signal comprising passing it though an optical pathway wherein the optical pathway comprises at least one circulator as described above.

In an aspect, the invention relates to a method of transmitting an optical beam comprising passing the beam through a nonreciprocal optical device comprising at least one beam angle turner. In another aspect, the invention relates to a method of transmitting an optical beam comprising passing the beam through a nonreciprocal optical device comprising at least two beam angle turners. In a further aspect, the invention relates to a modified Rochon comprising a pair of birefringent wedges optically coupled to one another, and an optical axis of one of the pair of birefringent wedges being oriented normal to the plane of normal incidence, and an optical axis of the other birefringent wedge being oriented 45 degrees in a plane of normal incidence with respect to an optical axis orientation the other birefringent wedge would possess in a conventional Rochon prism.

In another aspect, the invention relates to a modified Wollaston prism comprising a pair of birefringent wedges optically coupled to one another, and an optical axis of each of the pair of birefringent wedges being oriented perpendicularly to each other and 45 degrees in a plane of normal incidence with respect to an optical axis in a conventional Wollaston prism.

FIG. 1 shows an isometric view of an optical circulator, according to the invention, that uses a beam turner. Optical circulator 100 includes first optical port 102, third optical port 104, second optical port 106, first imaging element 170, second imaging element 172, first beam displacer/combiner 122, first nonreciprocal rotators 126A–B, first beam angle turners 130A–B, second beam angle turner 140A–B, second nonreciprocal rotators 146A–B, and second beam displacer/combiner 150.

Optical circulator 100 possesses a longitudinal axis, along which the various optical components are distributed, and a proximal and distal end. First optical port 102, and third optical port 104 are located at a proximal end, and second optical port 106 is located at a distal end of the optical circulator.

In preferable embodiments, the first, second, and third optical ports may comprise integrated optical circuits or optical fibers. First imaging element 170 may be preferably located on the optical path between the first and third optical ports and the first beam displacer/combiner. Second imaging element 172 may be preferably located on the optical path between the second optical port and the second beam displacer/combiner. Such arrangements result in the first and third optical ports on the proximal side and the second optical port on the distal side being conjugate images of each other. In a preferable embodiment, the imaging element may be a collimating lens. In a more preferable embodiment, the collimating lens may be a Grin lens. Preferably, the Grin lens may be located at second optical port 106, as shown.

First beam displacer/combiner 122 is optically coupled distally to the first and third optical ports. In a preferable embodiment, the first beam displacer/combiner is a birefringent crystal. In a more preferable embodiment, the first beam displacer/combiner comprises Yttrium Orthovanadate, calcite, rutile or α-BBO (barium borate). First nonreciprocal rotators 126A–B comprise a nonreciprocal Faraday polarization rotator and are optically coupled distally from the first beam displacer/combiner. In a preferable embodiment, first nonreciprocal rotators 126A–B comprise yttrium-iron-garnet (YIG), or Bi-added thick film crystals. The Bi-added thick film crystals preferably comprise a combination of $(YbTbBi)_3Fe_5O_{12}$ and $(GdBi)_3(FeAlGa)_5O_{12}$, or of YIG and $Y_{3x}Bi_xFe_5O_{12}$. First beam angle turners 130A–B comprises two birefringent wedges, and is optically coupled distally to the first nonreciprocal rotators. The first, and second, beam angle turner changes the beam propagation direction depending upon the beam polarization orientation and traveling direction. In a more preferable embodiment, the first beam angle turner comprises a prism. In a still more preferable embodiment, the first beam angle turner comprises a Wollaston, Rochon, or modified Wollaston or Rochon prism. These prisms change the propagation direction of an optical beam depending upon its polarization.

Conventional Wollaston and Rochon prisms are discussed further in Hecht, *Optics* 292 & 329 (1987) (2d. ed. Addison-Wesley). The modified Rochon or Wollaston prism differs from a conventional Rochon or Wollaston prism in the orientation of the optical axes of its wedges. In a modified Rochon prism, the optical axis of one of the wedges is oriented normal to the plane of normal incidence, which is the same as in a conventional Rochon prism. However, the optical axis in the other wedge is oriented 45 degrees in the plane of normal incidence with respect to the optical axis orientation the wedge would possess in a conventional Rochon prism. Similarly, in a modified Wollaston prism, the optical axis of each of its birefringent wedges are oriented perpendicularly to each other and 45 degrees in the plane of normal incidence with respect to the optical axis in a conventional Wollaston prism. There is a complete gap 136, defined by the first beam angle turners 130A–B, and the second beam angle turner 140A–B that is located distally from the first beam angle turners 130A–B. The first and second beam angle turners are therefore spaced apart from one another. The length of the complete gap defined by the first and second beam angle turners defines the spatial separation between the beam from the first optical port to the second optical port and the beam from the second optical port to the third optical port. Therefore, adjusting the length of the complete gap will permit adjustment of the spatial separation of the beams. The length of complete gap 136 is proportional to the separation of the beams at cross section D—D. The relationship may be described as $D \approx L*\theta$, where D is the beam separation distance, L is the length of complete gap 136, and $\theta$ is the beam separation angle. Second nonreciprocal rotators 146A–B comprise a nonreciprocal Faraday polarization rotator and is optically coupled distally from the second beam angle turners. In a preferable embodiment, the second nonreciprocal rotators comprise yttrium-iron-garnet (YIG), or Bi-added thick film crystals. The Bi-added thick film crystals preferably comprise a combination of $(YbTbBi)_3Fe_5O_{12}$ and $(GdBi)_3(FeAlGa)_5O_{12}$, or of YIG and $Y_{3x}Bi_xFe_5O_{12}$. Second beam displacer/combiner 150 is optically coupled distally from the second nonreciprocal rotators and proximally from the second optical port.

In operation, unpolarized light from first optical port 102 exits first imaging element 170 at a slight angle to the longitudinal axis of the first imaging element. The unpolarized light then enters first beam displacer/combiner 122, which acts as a polarization sensitive beam displacement plate. The unpolarized light is decomposed into two orthogonal polarization components. Within the first beam displacer/combiner, the first component is an ordinary light ray (O-ray) and the other component is an extraordinary light ray (E-ray). The E-ray walks off vertically from the O-ray through the first beam displacer/combiner, with the result that there is a top and bottom component.

The components then enter first nonreciprocal rotators 126A–B. In a preferable embodiment, first nonreciprocal rotator 126A rotates by 45 degrees counterclockwise a component of light passing through it from first optical port 102 to second optical port 106. In another preferable embodiment, first nonreciprocal rotator 126B rotates by 45 degrees clockwise a component of light passing through it from first optical port 102 to second optical port 106. In another preferred embodiment, the relative directions of rotation imparted by first nonreciprocal rotator 126A and second nonreciprocal rotator 146A, and by first nonreciprocal rotator 126B and second nonreciprocal rotator 146B, may be respectively reversed.

Upon exiting the first nonreciprocal rotators, both components have the same polarization orientation before entering first beam angle turners 130A–B. First beam angle turners 130A–B turn both components towards the longitudinal axis of the circulator. The components then exit the first beam angle turner and transit complete gap 136. The components next pass through second beam angle turner 140A–B, which bends the components such that they are aligned with the longitudinal axis of second imaging element 172. Viewing from the top of the circulator (as-seen in FIG. 2A, discussed below), the longitudinal axis of the second imaging element should be on substantially the same line with the axis of the first imaging element to achieve circulation from second optical port 106 to third optical port 104. Complete gap 136 is adjusted such that the angle turning at second beam angle turners 140A–B occurs at the circulator axis that is in line with the axis of first imaging element 170 and second imaging element 172. The components then enter second nonreciprocal rotators 146A–B. In a preferable embodiment, second nonreciprocal rotator 146A rotates by 45 degrees clockwise a component of light passing through it from first optical port 102 to second optical port 106. In another preferable embodiment, second nonreciprocal rotator 146B rotates by 45 degrees counterclockwise a component of light passing through it from first optical port 102 to second optical port 106. The component then pass through second beam displacer/combiner 150, where the beams are recombined. The recombined light beam then passes through second optical port 106 via second imaging element 172. Unpolarized light entering second optical port 106 will travel in the opposite direction. Second nonreciprocal rotators 146A–B will direct light along a different optical path towards third optical port 104. This creates optical circulation.

FIGS. 2A–B show top and side isometric views of optical circulator 100. FIG. 2A shows a top isometric view of optical circulator 100, together with an internal ray trace, showing directions of the light rays within the circulator. FIG. 2B shows a side isometric view of optical circulator 100, together with an internal ray trace, showing directions of the light rays within the circulator. Optical circulator 100 as depicted in FIGS. 2A–B has the same components, structure and operation as optical circulator 100 as depicted in FIG. 1.

Figure 3A:
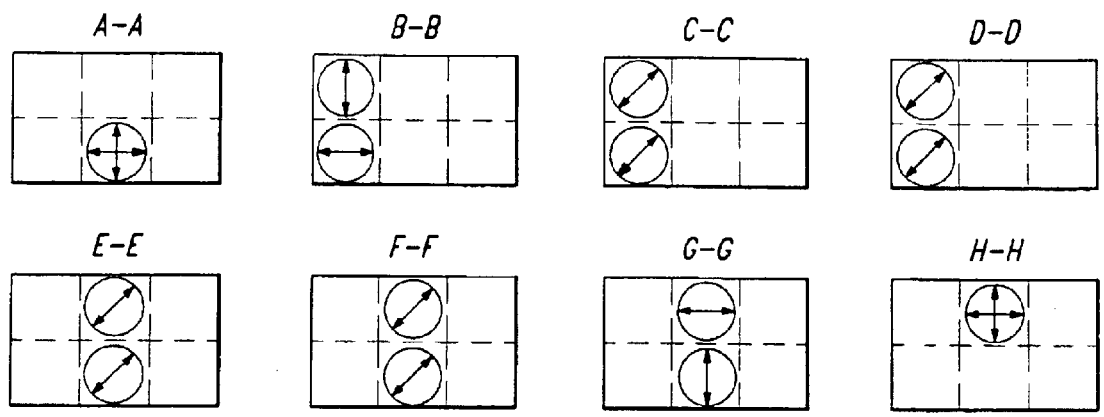
FIGS. 3A–B show cross sectional view of the three-port optical circulator of FIG. 1, with the spatial location and polarization states of the light beams traveling through the inventive circulator being indicated.
Figure 3B:
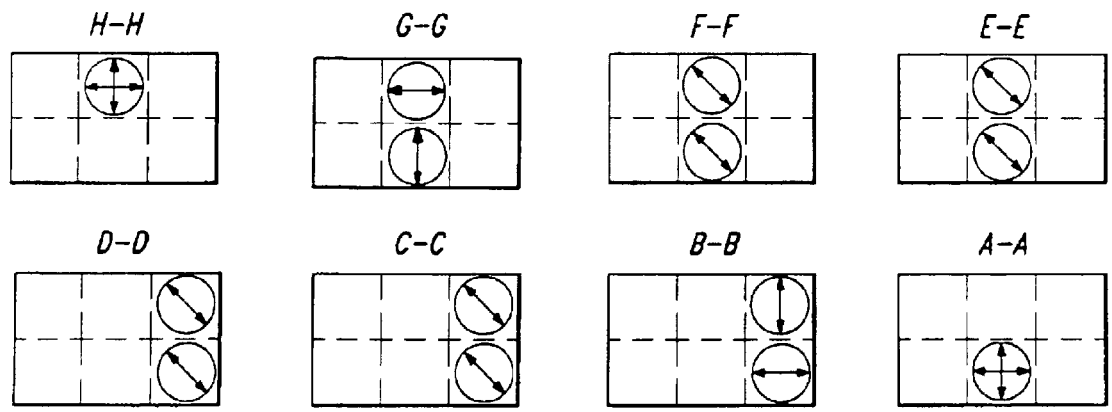

The operation of optical circulator 100 is illustrated in the cross sectional schematic representations shown in FIGS. 3A–B. FIG. 3A shows how the two orthogonal components of unpolarized light entering at first optical port 102 are manipulated so as to arrive at second optical port 106. The two unpolarized orthogonal components are shown at cross section A—A, as they exit first imaging element 170 and enter the first beam displacer/combiner. At cross-section B—B, upon exiting the first beam displacer/combiner, the top component is shown as being walked off vertically from the bottom component. At cross-section C—C, upon exiting first nonreciprocal rotators 126A–B, the polarization of the top components is shown as being rotated 45 degrees clockwise while the bottom component is shown as being rotated 45 degrees counter-clockwise. At cross-section D—D, upon exiting the first beam angle turner, both of the components are unchanged in polarization orientation and spatial position. Additionally, the first beam angle turner changes the propagation directions of the components from the directions that the components possessed at cross-section C—C. At cross-section E—E, upon traversing complete gap 136, both the top and bottom components are shown as being walked off equidistantly in the same direction—to the right of the cross-section of the circulator. At cross-section F—F, upon exiting second beam angle turner 140A–B, both of the components are unchanged in polarization orientation and spatial position. Additionally, the second beam angle turner 140A–B changes the propagation directions of the components to be substantially in line with the longitudinal axis of second imaging element 172. At cross-section G—G, upon exiting second nonreciprocal rotators 146A–B, the polarization of the top component is shown as being rotated 45 degrees clockwise while the bottom component is shown as being rotated 45 degrees counter-clockwise. At cross-section H—H, upon exiting second beam displacer/combiner 150, the two components are recombined to exit at second optical port 106.

FIG. 3B shows how the two orthogonal components of unpolarized light entering at second optical port 106 are manipulated so as to arrive at third optical port 104. The two unpolarized orthogonal components are shown at cross section H—H as they enter the second beam displacer/combiner. At cross-section G—G, the bottom component is shown as being walked off vertically downward from the top component, thus creating a top and bottom component. At cross-section F—F, the polarization of the top component is shown as being rotated 45 degrees clockwise while the bottom component is shown as being rotated 45 degrees counter-clockwise. Both polarization components traveling from second optical port 106 to third optical port 104 are now in the same polarization orientation. The components are also perpendicular to the polarization components traveling from first optical port 102 to second optical port 106. The orthogonal polarization orientation is due to the non-reciprocity of second nonreciprocal rotators 146A–B. At cross-section E—E, both of the components are unchanged in polarization orientation and spatial position, but their propagation directions have been changed. Additionally, the beam path of the polarization components traveling from second optical port 106 to third optical port 104 is different from the polarization components traveling from first optical port 102 to second optical port 106 because the polarization orientations of the two sets of components are perpendicular to each other as they are traveling through both beam angle turners. At cross-section D—D, both the top and bottom components are shown as being walked off equidistantly in the same direction—to the right of the cross-section of the circulator. At cross-section C—C, both of the components are unchanged in polarization orientation and spatial position, but their propagation directions have been changed to be substantially in alignment with third optical port 104.

At cross-section B—B, the polarization of the top component is shown as being rotated 45 degrees clockwise while the bottom component is shown as being rotated 45 degrees counter-clockwise. At cross-section A—A, the two components are recombined to exit at third optical port 104.

The beams traveling from first optical port 102 to second optical port 106 and from second optical port 106 to third optical port 104 enter and exit first beam displacer/combiner 122 and second beam displacer/combiner 150 are approximately in the same spatial location. However, the two beams possess different propagation directions such that they will travel to different optical ports, as shown in FIGS. 2A–B. This situation is generally true for embodiments according to the invention that are arranged in a fashion similar to that of optical circulator 100.

Figure 4:
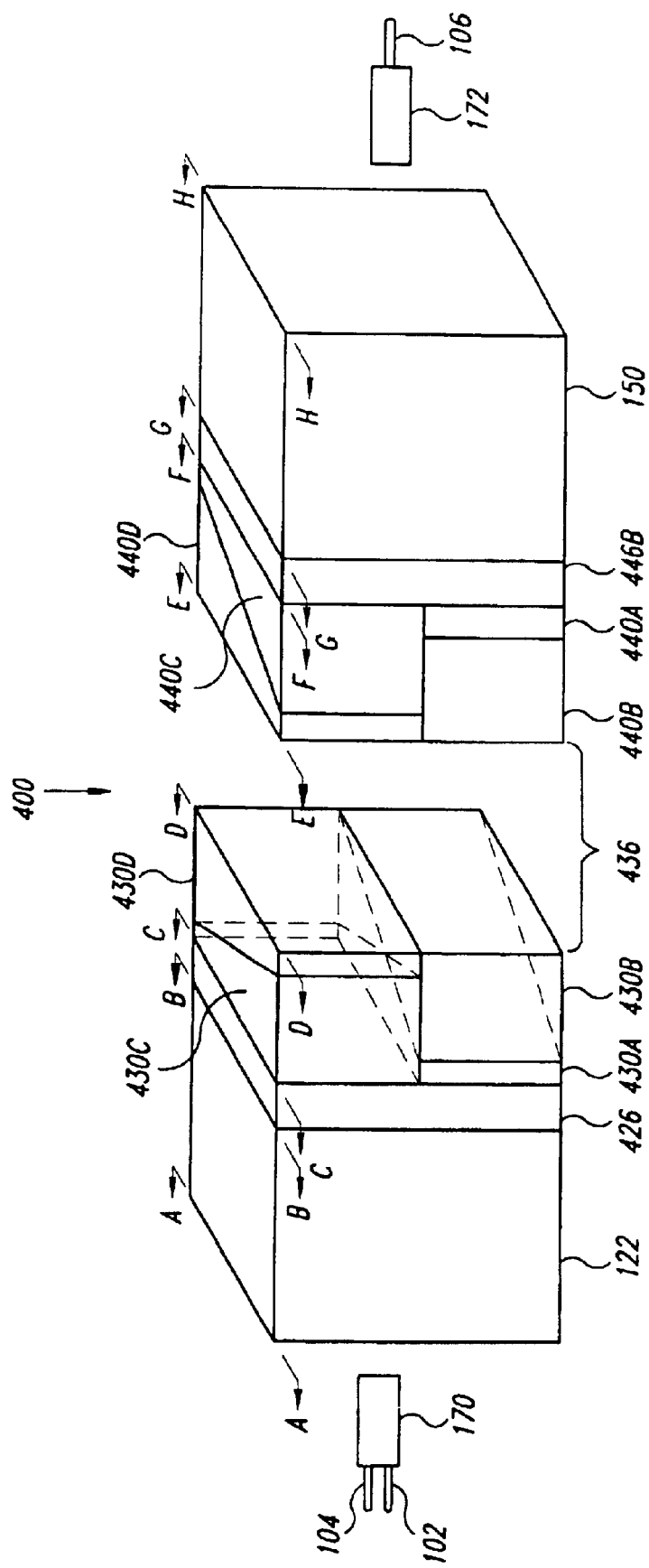
FIG. 4 shows a side isometric view of another embodiment of a three-port optical circulator according to the invention.

FIG. 4 shows a side isometric view of optical circulator 400, according to the invention. Optical circulator 400 includes first optical port 102, third optical port 104, second optical port 106, first imaging element 170, second imaging element 172, first beam displacer/combiner 122, first nonreciprocal rotator 426, first beam angle turners 430A–D, second beam angle turners 440A–D, second nonreciprocal rotator 446, and second beam displacer/combiner 150.

Optical circulator 400 possesses a longitudinal axis, along which the various optical components are distributed, and a proximal and distal end. First optical port 102, and third optical port 104 are located at a proximal end, and second optical port 106 is located at a distal end of the optical circulator.

In preferable embodiments, the first, second, and third optical ports may comprise integrated optical circuits or optical fibers. First imaging element 170 may be preferably located on the optical path between the first and third optical ports and the first beam displacer/combiner. Second imaging element 172 may be preferably located on the optical path between the second optical port and the second beam displacer/combiner. Such arrangements result in the first, and third optical ports on the proximal side and the second optical port on the distal side being conjugate images of each other. In a preferable embodiment, the imaging element may be a collimating lens. In a more preferable embodiment, the imaging element may be a Grin lens. The Grin lens may be located at second optical port 106, as shown.

First beam displacer/combiner 122 is optically coupled distally to the first and third optical ports. In a preferable embodiment, the first beam displacer/combiner is a birefringent crystal. In a more preferable embodiment, the first beam displacer/combiner comprises Yttrium Orthovanadate, calcite, rutile or -BBO. First nonreciprocal rotator 426 comprise a nonreciprocal Faraday polarization rotator and are optically coupled distally from the first beam displacer/combiner. In a preferable embodiment, first nonreciprocal rotator 426 comprises yttrium-iron-garnet (YIG), or Bi-added thick film crystals. The Bi-added thick film crystals preferably comprise a combination of $(YbTbBi)_3Fe_5O_{12}$ and $(GdBi)_3(FeAlGa)_5O_{12}$, or of Y.I.G. and $Y_{3x}Bi_xFe_5O_{12}$. First beam angle turners 430A–D comprise four birefringent wedges that are optically coupled distally to the first nonreciprocal rotators and to each other. In a more preferable embodiment, the first beam angle turners comprise one or more prisms. In a still more preferable embodiment, the first beam angle turners comprises a set of Wollaston, Rochon or modified Wollaston or Rochon prisms. The beam angle turners, which are indicated in optical circulator 400 by the pairs of beam angle turners 430A–B, 430C–D, 440A–B, and 440C–D, are stacked in the embodiment as shown. The arrangement of beam angle turners 430A–B and 430C–D is identical, except that they are rotated by 180 degrees with respect to the circulator's longitudinal axis. Similarly, beam angle turners 440A–B and 440C–D are identical, except for their 180 degrees rotation with respect to the circulator's longitudinal axis. Thus, beam angle turners 430C–D are stacked on top of beam angle turners 430C–D, to form a stacked set of beam angle turners. Likewise beam angle turners 440C–D are stacked on top of beam angle turners 1008A–B to form a stacked set of beam angle turners. The effect of these stacked sets of beam angle turners is to permit angle turning of both the top and bottom components that are orthogonal to each other in the same direction without having to change their orientation.

There is a complete gap 436, defined by the first beam angle turners 430A–D, and the second beam angle turners 440A–D that is located distally from first beam angle turners 430A–D. The first and second beam angle turners are therefore spaced apart from one another. The length of the complete gap defined by the first and second beam angle turners defines the spatial separation between the beam from the first optical port to the second optical port and the beam from the second optical port to the third optical port. Therefore, adjusting the length of the complete gap will permit adjustment of the spatial separation of the beams, as has been discussed above.

Second nonreciprocal rotator 446 comprises a nonreciprocal Faraday polarization rotator and is optically coupled distally from the second beam angle turners. In a preferable embodiment, the second nonreciprocal rotators comprise yttrium-iron-garnet (YIG), or Bi-added thick film crystals. The Bi-added thick film crystals comprise a combination of $(YbTbBi)_3Fe_5O_{12}$ and $(GdBi)_3(FeAlGa)_5O_{12}$, or of YIG and $Y_{3-x}Bi_xFe_5O_{12}$. Second beam displacer/combiner 150 is optically coupled distally from the second nonreciprocal rotators and proximally from the second optical port.

In operation, unpolarized light from first optical port 102 and exits first imaging element 170 at a slight angle to the longitudinal axis of first imaging element 170. The unpolarized light then enters first beam displacer/combiner 122, which acts as a polarization sensitive beam displacement plate. The unpolarized light is decomposed into two orthogonal polarization components. Within the first beam displacer/combiner, the first component is an ordinary light ray (O-ray) and the other component is an extraordinary light ray (E-ray). The E-ray walks off vertically from the O-ray through the first beam displacer/combiner, with the result that there is a top and bottom component. The components then enter first nonreciprocal rotator 426. In a preferable embodiment, first nonreciprocal rotator 426 rotates by 45 degrees clockwise both the top and bottom components of light passing through it from first optical port 102 to second optical port 106. In another preferred embodiment, the relative directions of rotation imparted by first nonreciprocal rotator 426 and second nonreciprocal rotator 446 may be respectively reversed.

Upon exiting the first nonreciprocal rotators, the components enter first beam angle turners 430A–D. The first beam angle turners turn both polarization components towards the longitudinal axis of the circulator without changing their polarization orientation. The components then exit the first beam angle turner and transit complete gap 436. The components next pass through second beam angle turners 440A–D, which bends the components such that they are aligned with the longitudinal axis of second imaging element 172. The first and second beam angle turners and the complete gap are adjusted so as to achieve alignment of the components with the longitudinal axis of the second imaging element and/or second optical port 106, as discussed above. The components then enter second nonreciprocal rotator 446. In a preferable embodiment, second nonreciprocal rotator 446 rotates by 45 degrees clockwise both top and bottom components of light passing through it from first optical port 102 to second optical port 106. The component then pass through second beam displacer/combiner 150, where the beams are recombined. The recombined light beam then passes through second optical port 106 via second imaging element 170. Unpolarized light entering second optical port 106 will travel along a different path from light traveling from first optical port 102 to second optical port 106. This is due to the non-reciprocity of first nonreciprocal rotator 426 and second nonreciprocal rotator 446. The light ultimately exits at third optical port 104. This creates optical circulation.

FIGS. 5A–B show top and side isometric views of optical circulator 400. FIG. 5A shows a top isometric view of optical circulator 400, together with an internal ray trace, showing directions of the light rays within the circulator. FIG. 5B shows a side isometric view of optical circulator 400, together with an internal ray trace, showing directions of the light rays within the circulator. Optical circulator 400 as depicted in FIGS. 5A–B has the same components, structure and operation as optical circulator 400 as depicted in FIG. 4.

Figure 6A:
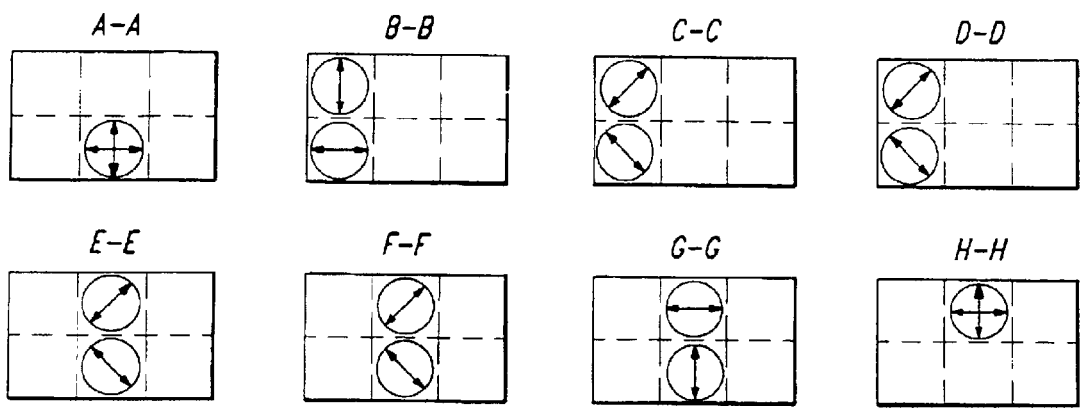
FIGS. 6A–B show cross sectional view of the three-port optical circulator of FIG. 4, with the spatial location and polarization states of the light beams traveling through the inventive circulator being indicated.
Figure 6B:
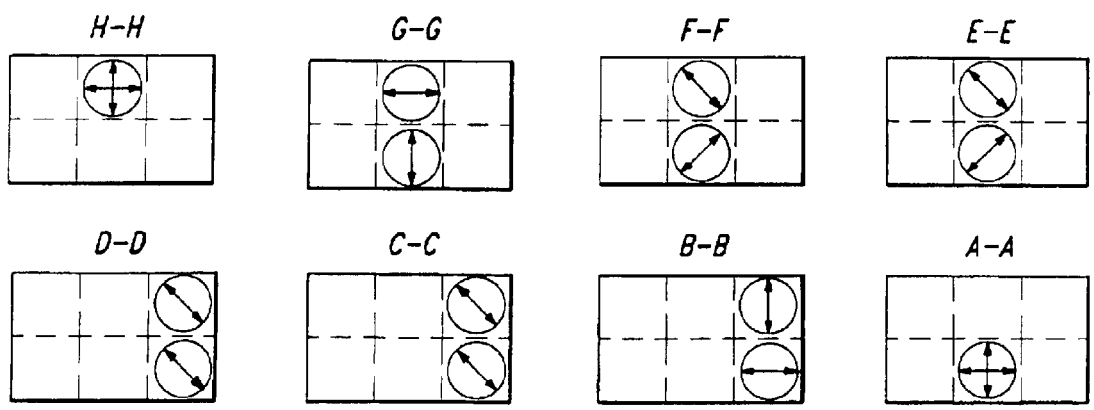

The operation of optical circulator 400 is illustrated in the cross sectional schematic representations shown in FIGS. 6A–B. FIG. 6A shows how the two orthogonal components of unpolarized light entering at first optical port 102 are manipulated so as to arrive at second optical port 106. The two unpolarized orthogonal components are shown at cross section A—A, as they exit first imaging element 170 and enter the first beam displacer/combiner. At cross-section B—B, upon exiting first beam displacer/combiner 122, the top component is shown as being walked off vertically from the bottom component. At cross-section C—C, upon exiting first nonreciprocal rotator 426, the polarization of the top and bottom component is shown as being rotated 45 degrees clockwise. At cross-section D—D, upon exiting first beam angle turners 430A–D, both of the components are unchanged in polarization orientation and spatial position, but their propagation direction is changed in the same direction. At cross-section E—E, upon traversing complete gap 1006, both the top and bottom components are shown as being walked off equidistantly in the same direction—to the right of the cross-section of the circulator. At cross-section F—F, upon exiting second beam angle turners 440A–D, both of the components are unchanged in polarization orientation and spatial position. Additionally, their propagation direction is changed to be in alignment with the longitudinal axis of second optical port 106. At cross-section G—G, upon exiting second nonreciprocal rotator 446, the polarization of both the top and bottom components is shown as being rotated 45 degrees clockwise. At cross-section H—H, upon exiting second beam displacer/combiner 150, the two components are recombined to exit at second optical port 106.

FIG. 6B shows how the two orthogonal components of unpolarized light entering at second optical port 106 are manipulated so as to arrive at third optical port 104. The two unpolarized orthogonal components are shown at cross section H—H as they enter the second beam displacer/combiner. At cross-section G—G, the bottom component is shown as being walked off vertically downward from the top component, thus creating a top and bottom component. At cross-section F—F, the polarization of both the top and bottom component is shown as being rotated 45 degrees clockwise. Both polarization components traveling from second optical port 106 to third optical port 104 are now in the same polarization orientation. The components are also perpendicular to the polarization components traveling from first optical port 102 to second optical port 106. The orthogonal polarization orientation is due to the non-reciprocity of second nonreciprocal rotator 446. At cross-section E—E, both of the components are unchanged in polarization orientation and spatial position, but are changed in their propagation direction such that they have substantially the same propagation direction. Additionally, the beam path of the polarization components traveling from second optical port 106 to third optical port 104 is different from the polarization components traveling from first optical port 102 to second optical port 106 because the polarization orientations of the two sets of components are perpendicular to each other as they are traveling though the beam angle turners. At cross-section D—D, both the top and bottom components are shown as being walked off equidistantly in the same direction—to the right of the cross-section of the circulator. At cross-section C—C, both of the components are unchanged in polarization orientation and spatial position, but their propagation direction is changed to be in alignment with the longitudinal axis of third optical port 104. At cross-section B—B, the polarization of both the top and bottom component is shown as being rotated 45 degrees clockwise. At cross-section A—A, the two components are recombined to exit at third optical port 104.

Figure 7:
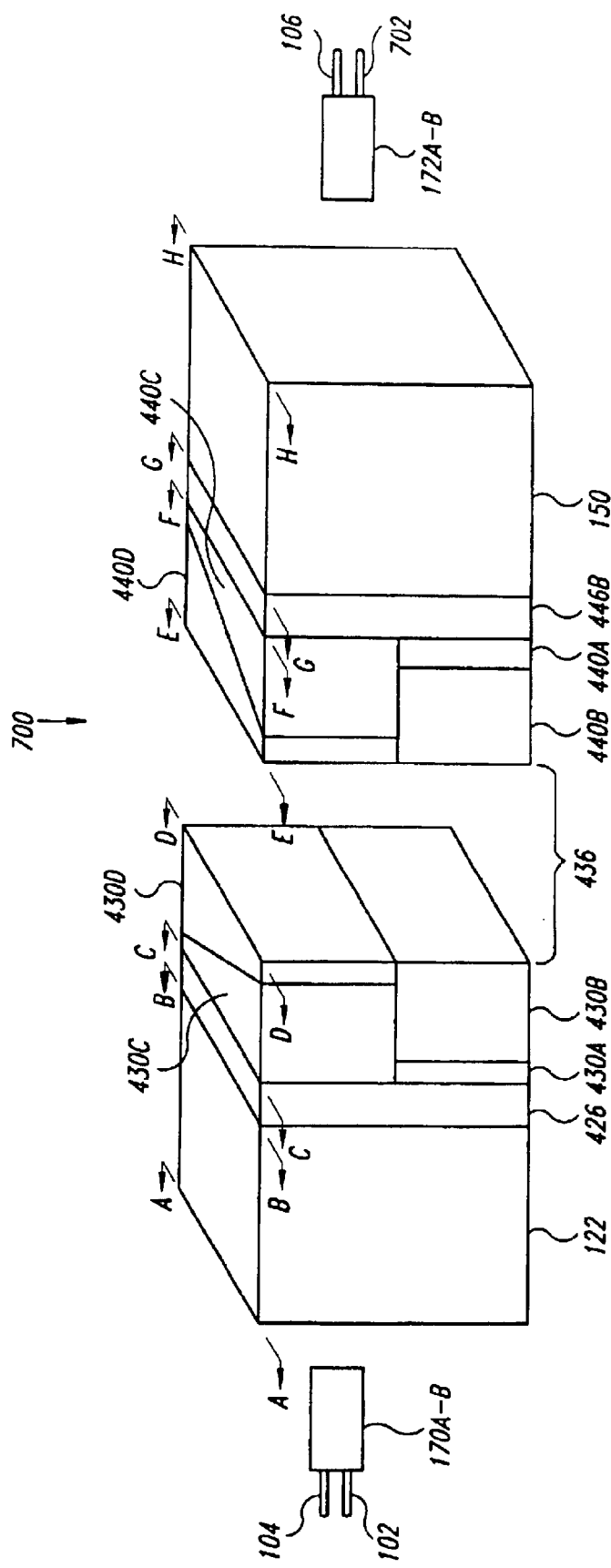
FIG. 7 shows a side isometric view of an embodiment of a four-port optical circulator according to the invention.

FIG. 7 shows a side isometric view of optical circulator 700, according to the invention. Optical circulator 700 shows a four optical port system. A significant advantage of the optical circulators according to the invention is that they are expandable. Such expandable optical circulators may have multiple optical ports beyond the minimum three optical ports. For example, inventive optical ports may have four, five, six or more optical ports, depending upon the application. This offers the advantage of lower cost and increased reliability, due to the lower number of circulators needed as compared to the prior art. Additionally, the optical footprint is reduced.

Optical circulator 700 is identical in components and structure to optical circulator 400, shown in FIG. 4, except that a fourth optical port 702 distal to the second beam displacer/combiner, and optically coupled to it via second imaging element 172, is added. Additionally, in a preferable embodiment, each optical port may include an imaging element, which more preferably is a collimating lens. These lenses are indicated as 170A–B and 172A–B. Thus, it is possible to expand the inventive three port device into a multiple port device simply by providing two arrays of fibers on each side with equal spacing between the optical ports in each array. The inter-array spacing is not critical, because the distance between the prism pairs is continuously adjustable to accommodate different fiber arrangements.

In operation, optical circulator 700 functions identically to optical circulator 400, except with respect to unpolarized light entering third optical port 104. In optical circulator 700, light is permitted to enter into third optical port 104, and is received at fourth optical port 702. The unpolarized light passes through first optical port 102 and enters first beam displacer/combiner 122 via first imaging element 170A. First beam displacer/combiner 122 acts as a polarization sensitive beam displacement plate. The unpolarized light is decomposed into two orthogonal polarization components. Within the first beam displacer/combiner, the first component is an ordinary light ray (O-ray) and the other component is an extraordinary light ray (E-ray). The E-ray walks off vertically upwards from the O-ray through the first beam displacer/combiner, with the result that there is a top and bottom component. The components then enter first nonreciprocal rotator 426. In a preferable embodiment, first nonreciprocal rotator 426 rotates by 45 degrees clockwise both the top and bottom components of light passing through it from first optical port 102 to second optical port 106. In another preferred embodiment, the relative directions of rotation imparted by first nonreciprocal rotator 426 and second nonreciprocal rotator 446 may be respectively reversed.

Upon exiting the first nonreciprocal rotators, the components enter first beam angle turners 430A–D. The first beam angle turners turn both polarization components towards the longitudinal axis of the circulator without changing their polarization orientation. The components then exit the first beam angle turner and transit complete gap 436. The components next pass through second beam angle turners 440A–D, which bends the components such that they are walk-off horizontally in the same direction—towards the right-hand side of optical circulator 700. The first and second beam angle turners and the complete gap are adjusted so as to achieve alignment of the components the with longitudinal axis of the second imaging element. Complete gap 436 is adjusted such that the beam walk-off across the gap is half of the adjacent port spacing. The components then enter second nonreciprocal rotator 446. In a preferable embodiment, second nonreciprocal rotator 446 rotates by 45 degrees clockwise both top and bottom components of light passing through it from first optical port 102 to second optical port 106. The component then pass through second beam displacer/combiner 150, where the beams are recombined. The recombined light beam then passes through fourth optical port 702 via second imaging element 172A.

FIGS. 8A–B show top and side isometric views of optical circulator 700. FIG. 8A shows a top isometric view of optical circulator 700, together with an internal ray trace, showing directions of the light rays within the circulator. FIG. 8B shows a side isometric view of optical circulator 700, together with an internal ray trace, showing directions of the light rays within the circulator. Optical circulator 700 as depicted in FIGS. 8A–B has the same components, structure and operation as optical circulator 700 as depicted in FIG 7.

Figure 9A:
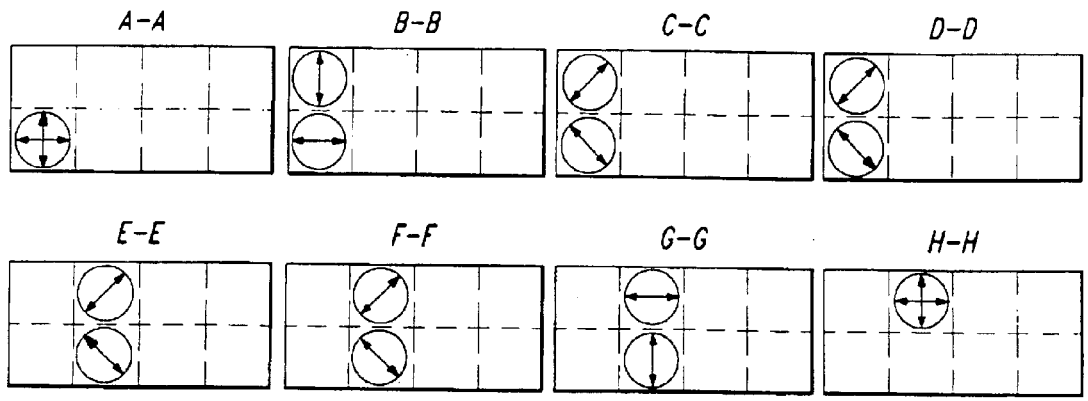
FIGS. 9A–C show cross sectional view of the four-port optical circulator of FIG. 7, with the spatial location and polarization states of the light beams traveling through the inventive circulator being indicated.
Figure 9B:
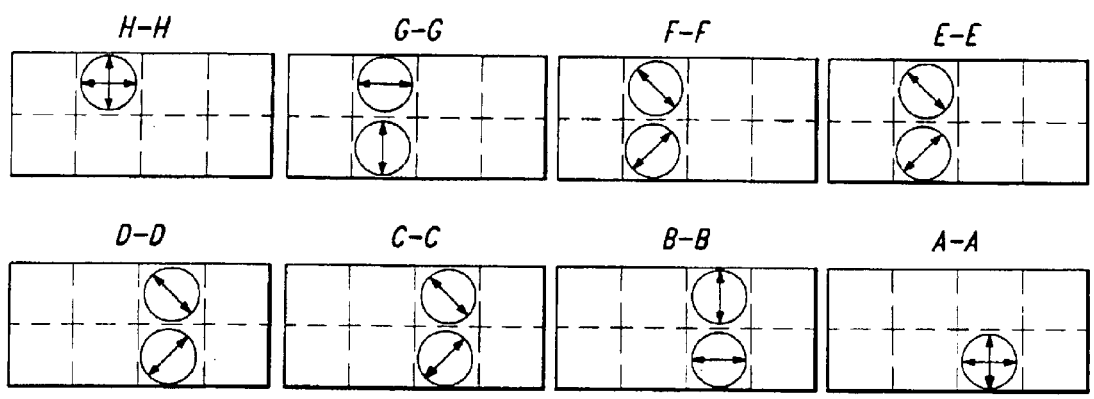
Figure 9C:
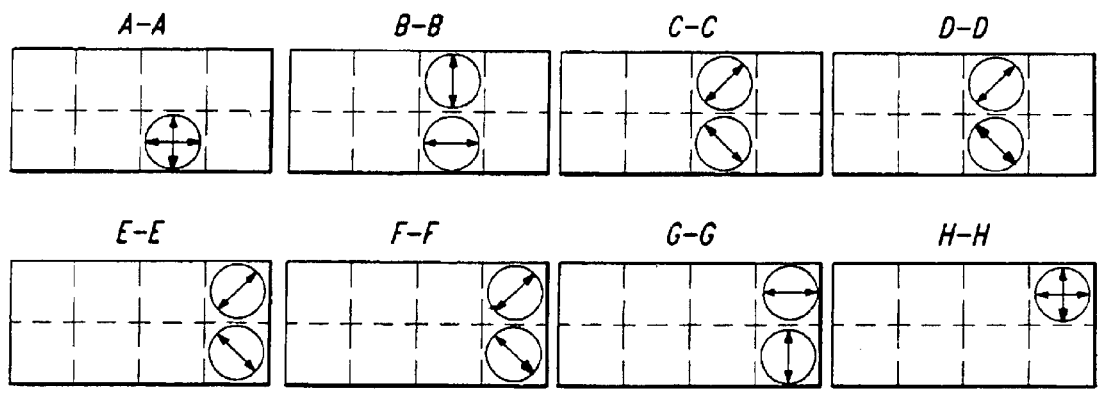

The operation of optical circulator 700 is illustrated in the cross sectional schematic representations shown in FIGS. 9A–C. FIGS. 9A–C illustrate the polarization states and spatial movement of unpolarized light entering at first optical port 102 that passes through to second optical port 106, with similar illustrations for unpolarized light entering second optical port 106 and passing through to third optical port 104. The changes in the polarization states and spatial movement have been discussed above in FIGS. 6A–B, and will not be discussed further here. FIG. 9C illustrates the polarization states and spatial movement of unpolarized light entering at third optical port 104 that passes through to fourth optical port 702.

FIG. 9C shows how the two orthogonal components of unpolarized light entering at third optical port 104 are manipulated so as to arrive at fourth optical port 702. The two unpolarized orthogonal components are shown at cross section A—A, as they exit first imaging element 170B and enter first beam displacer/combiner 122. At cross-section B—B, upon exiting first beam displacer/combiner 122, the top component is shown as being walked off vertically from the bottom component. At cross-section C—C, upon exiting first nonreciprocal rotator 426, the polarization of the top and bottom component is shown as being rotated 45 degrees clockwise. At cross-section D—D, upon exiting first beam angle turners 430A–D, both of the components are unchanged in polarization orientation and spatial position, but their propagation directions are changed with respect to cross-section C—C such that they propagate in substantially the same direction. At cross-section E—E, upon traversing complete gap 1006, both the top and bottom components are shown as being walked off equidistantly in the same direction—to the right of the cross-section of the circulator. At cross-section F—F, upon exiting second beam angle turners 440A–D, both of the components are unchanged in polarization orientation and spatial position. Additionally, the propagation directions of both components are changed to be in alignment with the longitudinal axis of second imaging element 172. At cross-section G—G, upon exiting second nonreciprocal rotator 446, the polarization of both the top and bottom components is shown as being rotated 45 degrees clockwise. At cross-section H—H, upon exiting second beam displacer/combiner 150, the two components are recombined to exit at fourth optical port 702.

Figure 10:
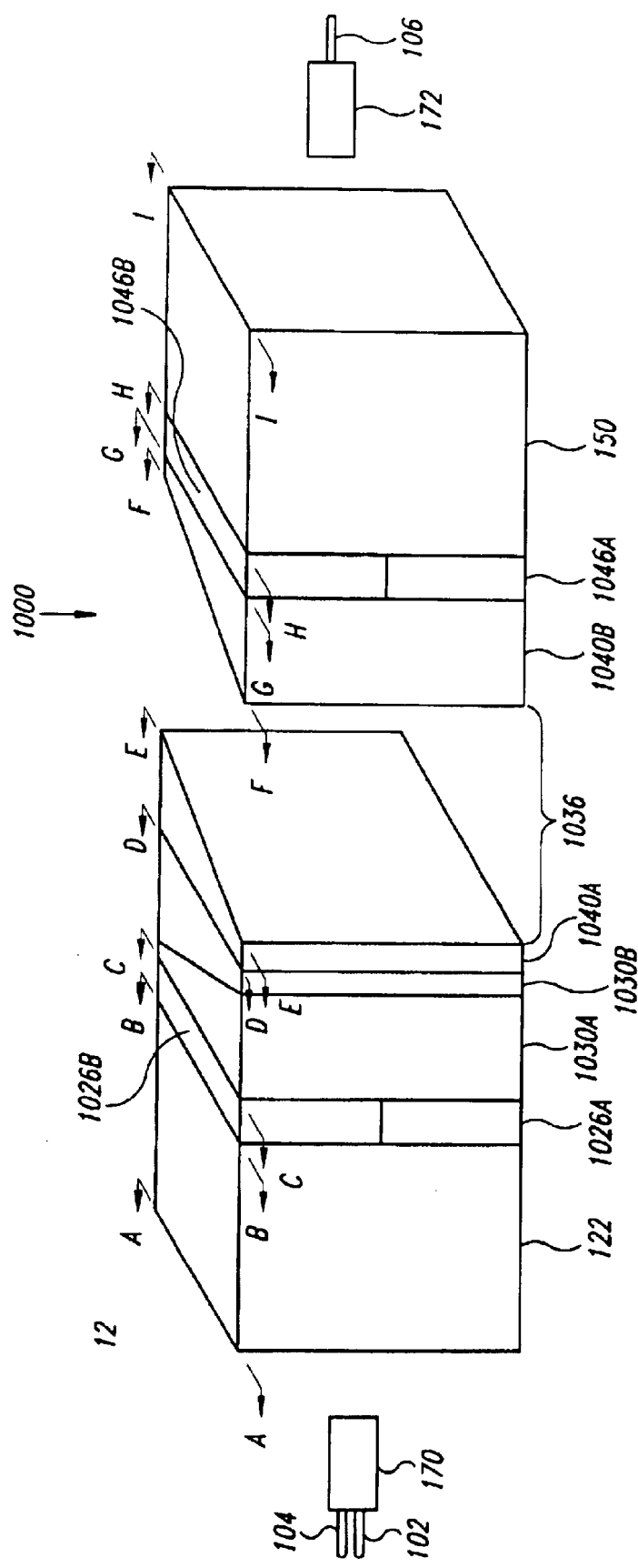
FIG. 10 shows a side isometric view of another embodiment of a three-port optical circulator according to the invention.

FIG. 10 shows an isometric view of optical circulator 1000, according to the invention. Optical circulator 1000 differs from the previously discussed inventive circulators in that complete gap 1036 is relocated from between the first beam angle turner and the second beam angle turner to being within the second beam angle turner 1040A–B. For example, in a preferable embodiment, a birefringent wedge pair split by a complete gap replaces a Wollaston, Rochon, or modified Wollaston or Rochon prism. In such an embodiment, the wedge pair may be formed of birefringent crystals with the optical axis of each birefringent wedge preferably parallel to one other. Such a structure differs from the wedge pair in a Wollaston, Rochon, or modified Wollaston or Rochon prism in the sense that the direction of the optical axis on each wedge in a Wollaston, Rochon, or modified Wollaston or Rochon prism is generally perpendicular to each other.

Such a preferable structure has the effect that, because the polarization direction of a beam traveling from first optical port 102 to second optical port 106 is perpendicular to that of a beam traveling from second optical port 106 to third optical port 104, the beams will experience different bending as they go through the birefringent wedge pair because of the birefringence in the wedge. In addition, the separation distance of the wedge pair may be adjusted to achieve desired forward and backward beam separation, as discussed generally above.

Optical circulator 1000 illustrates these features. Optical circulator 1000 includes first optical port 102, third optical port 104, second optical port 106, first imaging element 170, second imaging element 172, first beam displacer/combiner 122, first nonreciprocal rotators 1026A–B, first beam angle turners 1030A–B, second beam angle turners 1040A–B, complete gap 1036, second nonreciprocal rotators 1046A–B, and second beam displacer/combiner 150.

Optical circulator 1000 possesses a longitudinal axis, along which the various optical components are distributed, and a proximal and distal end. First optical port 102, and third optical port 104 are located at a proximal end, and second optical port 106 is located at a distal end of the optical circulator. In preferable embodiments, the first, second, and third optical ports may comprise integrated optical circuits or optical fibers. First imaging element 170 may be preferably located on the optical path between the first and third optical ports and the first beam displacer/combiner. Second imaging element 172 may be preferably located on the optical path between second optical port 106 and second beam displacer/combiner 150. Such arrangements result in the first and third optical ports on the proximal side and the second optical port on the distal side being conjugate images of each other. In a preferable embodiment, the imaging element may be a collimating lens. In a more preferable embodiment, the collimating lens may be a Grin lens. Preferably, the Grin lens may be located at second optical port 106, as shown. First beam displacer/combiner 122 is optically coupled distally to the first and third optical ports. In a preferable embodiment, the first beam displacer/combiner is a birefringent double refraction crystal. In a more preferable embodiment, the first beam displacer/combiner comprises Yttrium Orthovanadate, calcite, rutile or α-BBO (barium borate). First nonreciprocal rotators 1026A–B comprise a nonreciprocal Faraday polarization rotator and are optically coupled distally from the first beam displacer/combiner. In a preferable embodiment, first nonreciprocal rotators 1026A–B comprise yttrium-iron-garnet (YIG), or Bi-added thick film crystals. The Bi-added thick film crystals comprise a combination of (YbTbBi)$_3$Fe$_5$O$_{12}$ and (GdBi)$_3$(FeAlGa)$_5$O$_{12}$, or of YIG and Y$_{3-x}$Bi$_x$Fe$_5$O$_{12}$. First beam angle turners 1030A–B comprise a pair of birefringent wedges, and are optically coupled distally to the first nonreciprocal rotators. First beam angle turners 1030A–B change the beam propagation direction depending upon the beam polarization orientation and traveling direction, as discussed generally above. There is a complete gap 1036, defined by second beam angle turner 1040A–B. The second beam angle turner 1040A and second beam angle turner 1040B are therefore spaced apart from one another, and separated by complete gap 1036. The location of the gap differs from previously discussed embodiments in that the wedge pair that served as a second beam angle turner in the previously discussed embodiments is completely separated by complete gap 1036 in this embodiment. Additionally, the optical axes of the wedge pair comprising second beam angle turner 1040A and second beam angle turner 1040B are substantially parallel to one another, in contrast to a Wollaston, Rochon, or modified Wollaston or Rochon prism, where the optical axes are perpendicular. The separation of the beams at cross-section E—E is proportional to the length of complete gap 1036. The relationship may described as D≈L*θ, where D is the beam separation distance, L is the length of complete gap 1036, and θ is the beam separation angle. Second nonreciprocal rotators 1046A–B comprise a nonreciprocal Faraday polarization rotator and are optically coupled distally from the second beam angle turners. In a preferable embodiment, the second nonreciprocal rotators comprise yttrium-iron-garnet (YIG), or Bi-added thick film crystals. The Bi-added thick film crystals comprise a combination of (YbTbBi)$_3$Fe$_5$O$_{12}$ and (GdBi)$_3$(FeAlGa)$_5$O$_{12}$, or of YIG and Y$_{3-x}$Bi$_x$Fe$_5$O$_{12}$. Second beam displacer/combiner 150 is optically coupled distally from the second nonreciprocal rotators and proximally from the second optical port.

In operation, unpolarized light passes through first optical port 102, to first imaging element 170, which it exits at a slight angle to the longitudinal axis of first imaging element 170. The unpolarized light then enters first beam displacer/combiner 122, which acts as a polarization sensitive beam displacement plate. The unpolarized light is decomposed into two orthogonal polarization components. Within the first beam displacer/combiner, the first component is an ordinary light ray (O-ray) and the other component is an extraordinary light ray (E-ray). The E-ray walks off vertically from the O-ray through the first beam displacer/combiner, with the result that there is a top and bottom component.

The components then enter first nonreciprocal rotators 1026A–B. In a preferable embodiment, first nonreciprocal rotator 1026A rotates the top component by 45 degrees clockwise and the bottom component by 45 degrees counterclockwise. In a preferred embodiment, the relative directions of rotation imparted by first nonreciprocal rotator 1026A and second nonreciprocal rotator 1046A, and by first nonreciprocal rotator 1026B and second nonreciprocal rotator 1046B, may be respectively reversed.

Upon exiting the first nonreciprocal rotators, both components have the same polarization orientation. They enter first beam angle turners 1030A–B, which turn both components parallel to the longitudinal axis of the circulator. Second beam angle turner 1040A will change the propagation direction of the both polarization components through a deviation angle. This deviation angle is determined by the wedge angle of the second beam angle turner 1040A and the index of refraction along the beam polarization in second beam angle turner 1040A. The components then exit second beam angle turner 1040A and transit complete gap 1036. The components next pass through second beam angle turner 1040B, which bends the components such that they are aligned with the axis of second imaging element 172. Viewing from the top of the circulator (as seen in FIG. 8A, discussed below), the axis of the second imaging element should be substantially parallel with the axis of the first imaging element to achieve circulation from second optical port 106 to third optical port 104. Complete gap 1036 is adjusted such a beam entering first optical port 102 can exit second optical port 106 and a beam entering second optical port 106 can exit third optical port 104. Both polarization components then enter second nonreciprocal rotators 1046A–B. In a preferable embodiment, second nonreciprocal rotator 1046A rotates the top component by 45 degrees and the bottom component by 45 degrees counter-clockwise. The component then pass through second beam displacer/combiner 150, where the beams are recombined. The recombined light beam then passes through second optical port 106 via second imaging element 172. Unpolarized light entering second optical port 106 will travel along a different path from light traveling from first optical port 102 to second optical port 106. This is due to the non-reciprocity of first nonreciprocal rotator 1026A–B and second nonreciprocal rotator 1046A–B in combination with the beam angle turners, which are preferably polarization sensitive. The light ultimately exits at third optical port 104. This creates optical circulation.

In this embodiment, the displacement (walk-off) distance $d_3$ of the light components is determined by the birefringence of the second beam angle turner 1040A and second beam angle turner 1040B. For example, in the case of a $YVO_4$ wedge pair, assuming the c axis of the $YVO_4$ is perpendicular to the longitudinal axis of the circulator, the displacement $d_3$ can be expressed as:

$$d_3 = \frac{1}{2} d_4 \sin 2\theta \left( \frac{n_c}{\sqrt{1-(n_c \sin\theta)^2}} - \frac{n_a}{\sqrt{1-(n_a \sin\theta)^2}} \right)$$

where θ is the wedge angle of the second beam angle turner 1040A–B angle, $n_a$ and $n_c$ are the index of refraction and polarization along the a axis and c axis respectively, and $d_4$ is the length of the complete gap 1036. An advantage of using the preferable birefringent wedge pair that may be formed by second beam angle turners 1040A–B is that the walk-off distance can be adjusted by simply changing the distance between the wedges of the wedge pair, as discussed above. Further, a large walk-off distance can be achieved cost effectively without using long birefringent walk-off crystals.

Figure 11A:
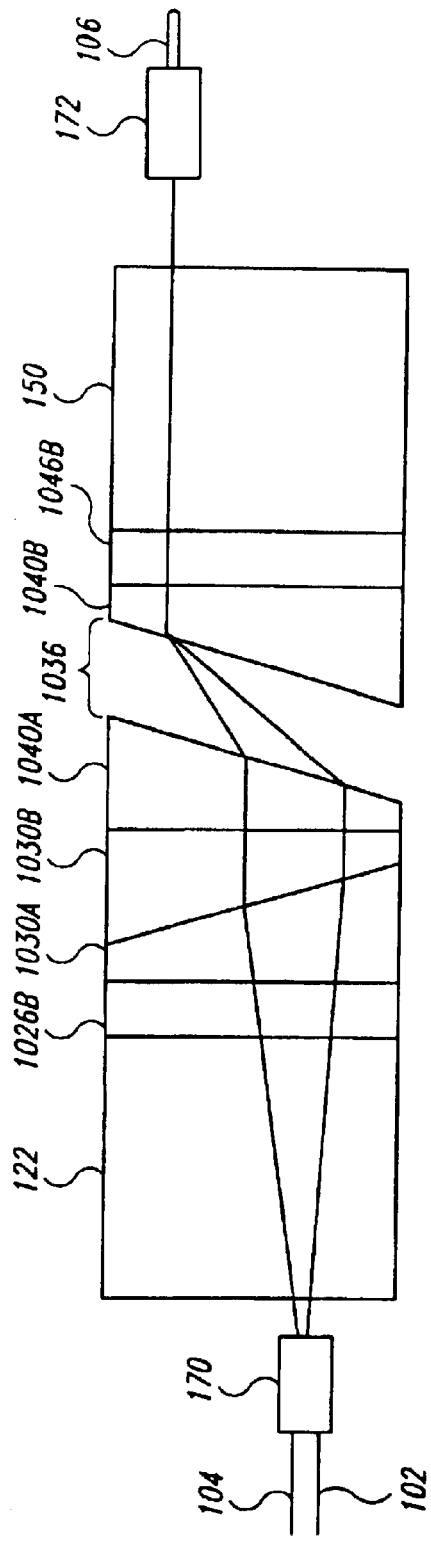
FIGS. 11A–B show a top and side isometric view of the three-port optical circulator of FIG. 4
Figure 11B:
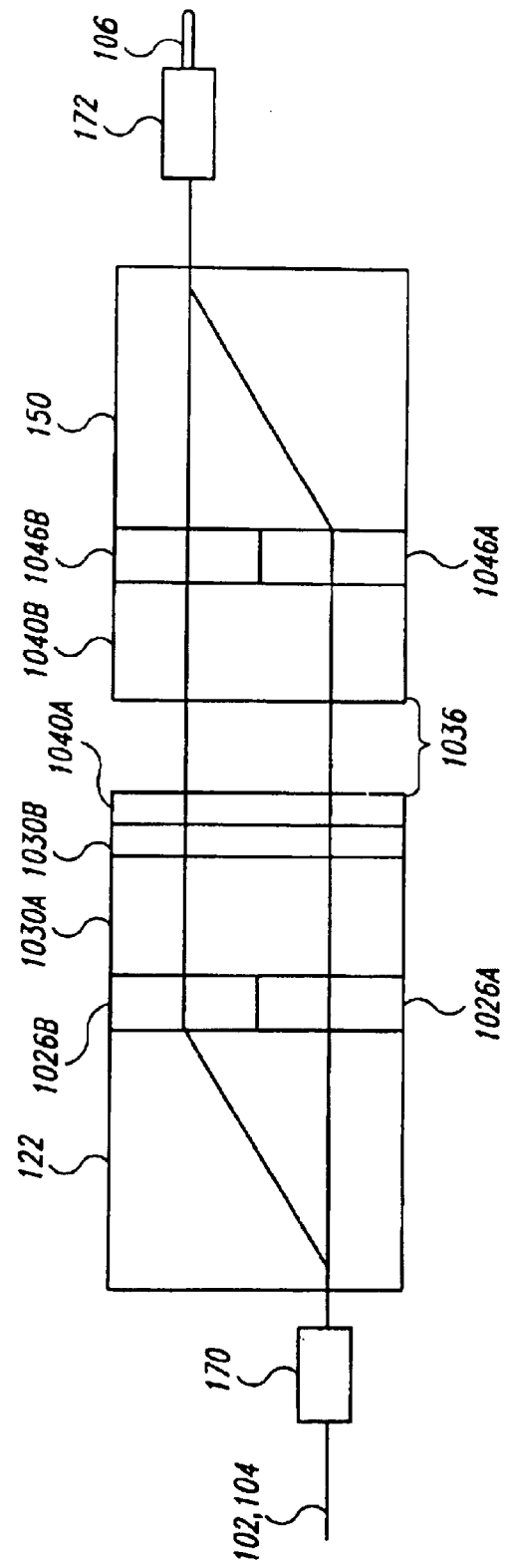

FIGS. 11A–B show top and side isometric views of optical circulator 1000. FIG. 11A shows a top isometric view of optical circulator 1000, together with an internal ray trace, showing directions of the light rays within the circulator. FIG. 11B shows a side isometric view of optical circulator 1000, together with an internal ray trace, showing directions of the light rays within the circulator. Optical circulator 1000 as depicted in FIGS. 11A–B has the same components, structure and operation as optical circulator 1000 as depicted in FIG. 10.

Figure 12A:
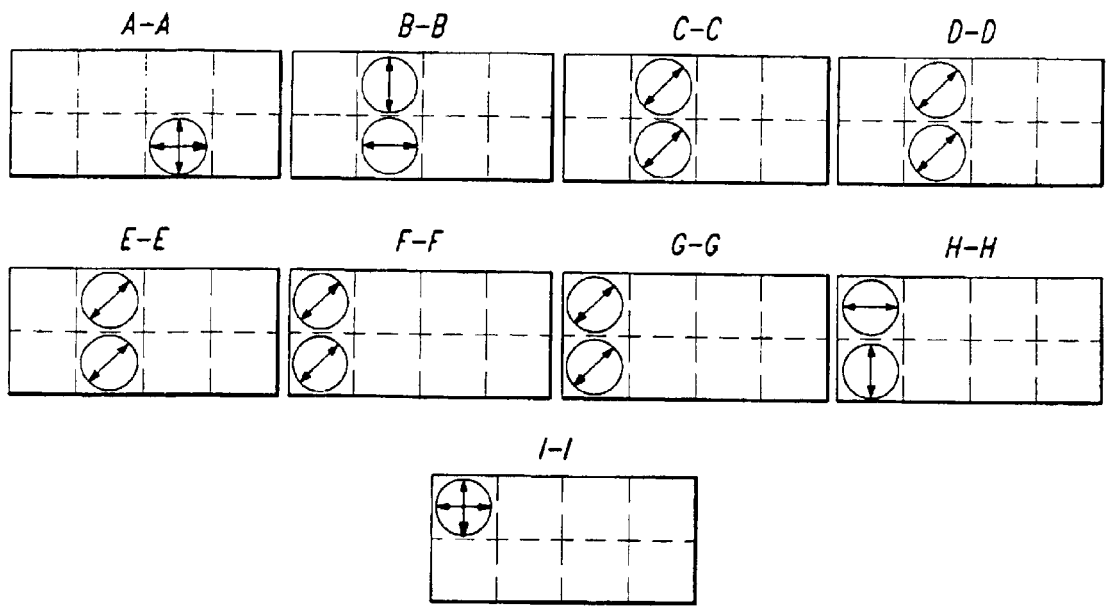
FIGS. 12A–B show cross sectional view of the three-port optical circulator of FIG. 10, with the spatial location and polarization states of the light beams traveling through the inventive circulator being indicated.
Figure 12B:
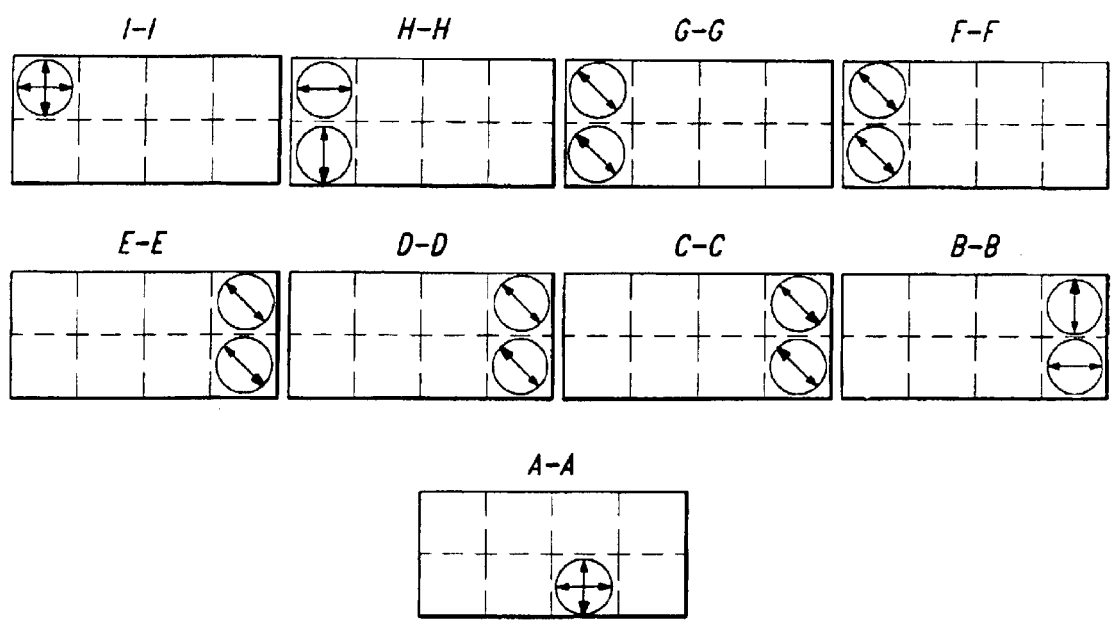

The operation of optical circulator 1000 is illustrated in the cross sectional schematic representations shown in FIGS. 12A–B. FIG. 12A shows how the two orthogonal components of unpolarized light entering at first optical port 102 are manipulated so as to arrive at second optical port 106. The two unpolarized orthogonal components are shown at cross section A—A, as they exit first imaging element 170 and enter the first beam displacer/combiner. At cross-section B—B, upon exiting the first beam displacer/combiner, the top component is shown as being walked off vertically from the bottom component. At cross-section C—C, upon exiting first nonreciprocal rotators 1026A–B, the polarization of the top components is shown as being rotated 45 degrees clockwise while the bottom component is shown as being rotated 45 degrees counter-clockwise. At cross-section D—D, upon exiting first beam angle turner 1030A–B, both of the components are unchanged in polarization orientation and spatial position. At cross-section E—E, upon exiting second beam angle turner 1040A, both of the components are unchanged in polarization orientation and spatial position. However, first beam angle turner 1030A–B and second beam angle turner 1040A change the propagation directions of the components from the directions that the components possessed at cross-section C—C. At cross-section F—F, upon traversing complete gap 1036, both the top and bottom components are shown as being walked off equidistantly in the same direction—to the left of the cross-section of the circulator. At cross-section G—G, upon exiting second beam angle turner 1040B, both of the components are unchanged in polarization orientation and spatial position. However, the second beam angle turner 1040B changes the propagation direction of the components to be substantially in line with the axis of second imaging element 172. At cross-section H—H, upon exiting second nonreciprocal rotators 1046A–B, the polarization of the top component is shown as being rotated 45 degrees clockwise while the bottom component is shown as being rotated 45 degrees counter-clockwise. At cross-section I—I, upon exiting second beam displacer/combiner 150, the two components are recombined to exit at second optical port 106.

FIG. 12B shows how the two orthogonal components of unpolarized light entering at second optical port 106 are manipulated so as to arrive at third optical port 104. The two unpolarized orthogonal components are shown at cross section H—H as they enter the second beam displacer/combiner. At cross-section G—G, the bottom component is shown as being walked off vertically downward from the top component, thus creating a top and bottom component. At cross-section F—F, the polarization of the top component is shown as being rotated 45 degrees clockwise while the bottom component is shown as being rotated 45 degrees counter-clockwise. At cross-section E—E, both of the components are unchanged in polarization orientation and spatial position, but their propagation directions have been changed. At cross-section D—D, both the top and bottom components are shown as being walked off equidistantly in the same direction—to the right of the cross-section of the circulator. At cross-section C—C, both of the components are unchanged in polarization orientation and spatial position, but their propagation directions have been changed to be substantially in alignment with third optical port 104. At cross-section B—B, the polarization of the top component is shown as being rotated 45 degrees clockwise while the bottom component is shown as being rotated 45 degrees counter-clockwise. At cross-section A—A, the two components are recombined to exit at third optical port 104.

It will be apparent to those skilled in the art that various modifications and variations can be made in the circulators, systems and methods of the present invention without departing from the spirit or scope of the invention. Thus, it is intended that the present invention cover the modifications and variations of this invention provided they come within the scope of the appended claims and their equivalents.

What is claimed is:

1. A method of tuning a spatial separation between a first optical port of an optical circulator and a third optical port of the optical circulator comprising:

providing the optical circulator, and the optical circulator having a longitudinal axis, and the optical circulator comprising a first optical port located at an end of the optical circulator, a second optical port located at a distal end of the optical circulator from the first optical port along the longitudinal axis, and a third optical port located at the same end of the optical circulator as the first optical port;

passing a first optical beam from the first optical port to the second optical port, wherein the first optical beam enters the optical circulator from the first optical port at an angle to the longitudinal axis such that the first optical beam diverges from the longitudinal axis, passing a first optical beam further comprising:

turning the first optical beam towards the longitudinal axis with a first beam angle turner; and turning the first optical beam with a second beam angle turner such that the first optical beam is aligned with the longitudinal axis of an imaging element for the second optical port, wherein the first beam angle turner is separated from the second beam angle turner by a complete gap;

passing a second optical beam from the second optical port to the third optical port, wherein the second optical beam enters the optical circulator from the second optical port aligned with the longitudinal axis, passing the second optical beam further comprising:

turning the second optical beam with the second beam angle turner such that the second optical beam diverges from the longitudinal axis; and turning the second optical beam with the first optical beam turner back towards the longitudinal axis; and adjusting a length of the complete gap causing a corresponding adjustment in a spatial separation between the first optical beam and the second optical beam, wherein the location of the first optical beam and the second light beam define the location of the first optical port and the third optical port.

2. The method of claim 1, wherein the first beam angle turner or second beam angle turner comprises a Rochon prism, a Wollaston prism, a modified Rochon prism, a modified Wollaston prism, or a pair of birefringent wedges separated by a complete gap.

3. The method of claim 1, wherein each of the first beam angle tumors or second beam angle turners comprise two or more Rochon prisms, Wollaston prisms, modified Rochon prisms, modified Wollaston prisms, or a pair of birefringent wedges separated by a complete gap.

4. The method of claim 1, wherein the optical circulator comprises a polarization mode dispersion free optical circulator.

5. The method of claim 1, wherein passing a first optical beam from the first optical port to the second optical port further comprises separating the first optical beam into a first polarization and a second polarization, and wherein passing a second optical beam from the second optical port to the third optical port further comprises separating the second optical beam into a first polarization and a second polarization.

6. A method of transmitting an optical beam comprising:

passing a first optical beam through a nonreciprocal optical device from a first port to a second port, the optical device comprising a first compound beam angle turner, a second compound beam angle turner and a complete gap, wherein both an e-ray and an o-ray of the first optical beam propagate through both the first beam angle turner, the second beam angle turner and the complete gap, wherein the first beam angle turner turns the first optical beam to converge towards a longitudinal axis of the nonreciprocal optical device and the second beam angle turner aligns the first optical beam with the longitudinal axis;

passing a second optical beam through the nonreciprocal optical device from a second port to a third port, the third port being adjacent the first port, wherein the second optical beam passes through the first beam angle turner, the second beam angle turner, and the complete gap, wherein adjusting the complete gap adjusts a distance between the first optical beam at the first port and the second optical beam at the third port, wherein the second beam turner turns the second optical beam away from the longitudinal axis of the nonreciprocal optical device and the first beam turner turns the second optical beam back towards the longitudinal axis of the nonreciprocal optical device; and wherein any polarization rotators of which the nonreciprocal optical device is comprised are nonreciprocal polarization rotators.

7. The method of claim 6, wherein the first beam angle turner or second beam angle turner comprises a Rochon prism, a Wollaston prism, a modified Rochon prism, a modified Wollaston prism, or a pair of birefringent wedges separated by a complete gap.

8. A method as defined in claim 6, wherein passing a first optical beam further comprises at least one of:

passing the first optical beam through the complete gap before passing the first optical beam through the first beam angle turner;

passing the first optical beam through the complete gap after passing the first optical beam through the first angle beam angle turner;

passing the second optical beam through the complete gap before passing the second optical beam through the second beam angle turner; and passing the second optical beam through the complete gap alter passing the second optical beam through the second beam angle turner.

9. An optical circulator comprising:

a nonreciprocal optical device comprising a first end having a first optical port and a third optical port and a second end having a second optical port, wherein a first optical beam received through the first optical port and traveling to the second optical port is separated into an e-ray and an o-ray by a first beam splitter and wherein the e-ray and the o-ray arc diverging from a longitudinal axis of the nonreciprocal optical device;

a first beam angle turner and a second beam angle turner, wherein both the e-ray and the o-ray of the optical beam propagate through both the first beam angle turner and the second beam angle turner, wherein the first angle beam angle turner causes the e-ray and the o-ray to converge to the longitudinal axis and wherein the second beam angle turner aligns the e-ray and the o-ray with the second optical port;

a beam combiner that recombines the e-ray and the o-ray into the first optical beam; and wherein any polarization rotators of which the nonreciprocal optical device is comprised are nonreciprocal polarization rotators.

10. The optical circulator of claim 9, wherein the first beam angle turner or second beam angle turner comprises a Rochon prism, a Wollaston prism, a modified Rochon prism, a modified Wollaston prism, or a pair of birefringent wedges separated by a complete gap.

11. The optical circulator of claim 9, wherein the optical circulator comprises a polarization mode dispersion free optical circulator.

12. The optical circulator of claim 9, further comprising a complete gap disposed between the first beam angle turner and the second beam angle turner, wherein the complete gap controls a distance between the first optical beam and a second optical beam that travels from the second optical port to a third optical port, wherein the second beam angle turner turns the second optical beam away from the longitudinal axis and the first beam angle turner turns the second optical beam towards the third optical port.

13. An optical circulator, and the optical circulator having a longitudinal axis, and the optical circulator comprising a first optical port located at an end of the optical circulator, a second optical port located at a distal end of the optical circulator from the first optical port along the longitudinal axis, the third optical port located at the same end of the optical circulator as the first optical port, and the optical circulator comprising:

a first beam angle turning means located along the longitudinal axis between the first optical port and the second optical port, for turning a beam through an angle, wherein the first beam angle turning means turns a first light beam towards the longitudinal axis and turns a second light beam such that the second light beam diverges from the longitudinal axis;

a second beam angle turning means located along the longitudinal axis distally from the first beam angle turner, for turning a beam through an angle, wherein the second beam angle turning means aligns the first light beam with the longitudinal axis and turns the second optical beam towards the longitudinal axis, and the first beam angle turning means and the second beam angle turning means being separated by a complete gap; and wherein adjusting a length of the complete gap causes a corresponding adjustment in a spatial separation between a first light beam traveling from the first optical port to the second optical port and a second light beam traveling from the second optical port to the third optical port, wherein the location of the first light beam and the second light beam define the location of the first optical port and the third optical port.

14. The optical circulator of claim 13, wherein the first beam angle turning means or second beam angle turning means comprises a Rochon prism, a Wollaston prism, a modified Rochon prism, a modified Wollaston prism or a pair of birefringent wedges separated by a complete gap.

15. The optical circulator of claim 13, wherein each of the first beam angle turning means or second beam angle turning means comprise two or more Rochon prisms, Wollaston prisms, modified Rochon prisms, modified Wollaston prisms, or a pair of birefringent wedges separated by a complete gap.

16. The optical circulator of claim 13, wherein the optical circulator comprises a polarization mode dispersion free optical circulator.

17. The optical circulator of claim 13, wherein the optical circulator comprises four or more optical ports.

18. An optical circulator having a longitudinal axis, the optical circulator comprising a first optical port located at a proximal end of the optical circulator, a second optical port located at a distal end of the optical circulator from the first optical port along the longitudinal axis, the third optical port located at the same and of the optical circulator as the first optical port, and the optical circulator comprising:

a first compound beam angle turning means located along the longitudinal axis between the first optical port and the second optical port, for turning a beam through an angle, wherein the first compound beam angle turning means turns a first light beam towards the longitudinal axis and turns a second light beam such that the second light beam diverges from the longitudinal axis;

a second compound beam angle turning means located along the longitudinal axis distally from the first compound beam angle turner, for turning a beam through an angle, wherein the second compound beam angle turning means aligns the first light beam with the longitudinal axis and turns the second optical beam towards tho longitudinal axis, and the first compound beam angle turning means and the second compound beam angle turning means being separated by a complete gap, a length of said gap being adjustable to cause a corresponding adjustment in a spatial separation between a first light beam traveling from the first optical port to the second optical port and a second light beam traveling from the second optical port to the third optical port; and wherein the location of the first light beam and the second light beam define the location of the first optical port and the third optical port.

19. The optical circulator of claim 18, wherein the first compound beam angle turning means or second compound beam angle turning means comprises a Rochon prism, a Wollaston prism, a modified Rochon prism, a modified Wollaston prism or a pair of birefringent wedges separated by a complete gap.

20. The optical circulator of claim 18, wherein each of the first compound beam angle turning means or second compound beam angle turning means comprise two or more Rochon prisms, Wollaston prisms, modified Rochon prisms, modified Wollaston prisms, or a pair of birefringent wedges separated by a complete gap.

21. The optical circulator of claim 18, wherein the optical circulator comprises a polarization mode dispersion free optical circulator.

22. The optical circulator of claim 18, wherein the optical circulator comprises four or more optical ports.

* * * * *

UNITED STATES PATENT AND TRADEMARK OFFICE
CERTIFICATE OF CORRECTION

PATENT NO. : 6,822,793 B2
APPLICATION NO. : 09/944593
DATED : November 23, 2004
INVENTOR(S) : Ping Xie and Yonglin Hang It is certified that error appears in the above-identified patent and that said Letters Patent is hereby corrected as shown below:

<u>Column 4</u>
Line 55, change "orientation, for" to --orientation. For--

<u>Column 5</u>
Line 12, change "OTDR=s" to --OTDRs--

<u>Column 12</u>
Line 23, change "446" to --446B--
Line 49, change "-BBO" to --α-BBO--

<u>Column 13</u>
Line 6, change "430C-D" to --430A-B--
Line 9, change "1008A-B" to --440A-B--
Line 26, change "446" to --446B--
Line 36, before "102" insert --enters--
Line 55, "446" to --446B--

<u>Column 14</u>
Line 45, change "1006" to --436--
Line 53, change "446" to --446B--

<u>Column 15</u>
Line 7, change "446" to --446B--

<u>Column 16</u>
Line 10, change "446" to --446B--
Line 27, change "446" to --446B--
Line 28, change "446" to --446B--

<u>Column 17</u>
Line 8, change "1006" to --436--
Line 17, change "446" to --446B--

<u>Column 19</u>
Line 23, change "8A" to --11A--

UNITED STATES PATENT AND TRADEMARK OFFICE
CERTIFICATE OF CORRECTION

PATENT NO.       : 6,822,793 B2
APPLICATION NO.  : 09/944593
DATED            : November 23, 2004
INVENTOR(S)      : Ping Xie and Yonglin Hang It is certified that error appears in the above-identified patent and that said Letters Patent is hereby corrected as shown below:

Column 21
Line 67, change "tumors" to --turners--

Column 22
Line 60, claim 8 change "alter" to --after--

Signed and Sealed this

Tenth Day of June, 2008

JON W. DUDAS
*Director of the United States Patent and Trademark Office*